United States Patent [19]

McLachlan et al.

[11] Patent Number: 5,494,584

[45] Date of Patent: Feb. 27, 1996

[54] METHOD AND APPARATUS FOR CONTROLLING A PUMP UPSTREAM OF A CENTRIFUGE

[75] Inventors: James E. McLachlan, 2000 N. Miramichi Dr., Evart, Mich. 49631; Michael G. Domagalski, Grandville; Bruce I. Gilman, Kentwood, both of Mich.

[73] Assignee: James E. McLachlan, Evart, Mich.

[21] Appl. No.: 261,332

[22] Filed: Jun. 16, 1994

Related U.S. Application Data

[63] Continuation of Ser. No. 4,590, Jan. 14, 1993, Pat. No. 5,344,570.

[51] Int. Cl.⁶ .......................... B01D 17/12; B01D 17/038
[52] U.S. Cl. .......................... 210/739; 175/66; 175/206; 210/145; 210/512.1; 210/787; 417/1; 417/43; 494/1; 494/10; 494/37
[58] Field of Search ...................... 210/143, 145, 210/170, 207, 208, 194, 195.1, 257.1, 258, 259, 260, 360.1, 512.1, 513, 521, 709, 724, 738, 739, 747, 787, 803, 804, 806; 175/24, 66, 206, 207, 217; 494/1, 5, 7, 8, 11, 37, 84, 85, 901; 208/13, DIG. 1; 166/53, 75.1, 267

[56] References Cited

U.S. PATENT DOCUMENTS

| | | | |
|---|---|---|---|
| 2,156,333 | 5/1939 | Cross et al. | 175/66 |
| 2,649,668 | 8/1953 | Slomer | 210/97 |
| 2,870,990 | 1/1959 | Bergey | 175/66 |
| 2,895,669 | 7/1959 | Bobo | 175/66 |
| 2,923,151 | 2/1960 | Engle et al. | 175/66 |
| 2,928,546 | 3/1960 | Church | 210/107 |
| 2,955,753 | 10/1960 | O'Conor et al. | 210/145 |
| 2,961,154 | 11/1960 | Bergey | 210/145 |
| 3,070,291 | 12/1962 | Bergey | 210/145 |

(List continued on next page.)

FOREIGN PATENT DOCUMENTS

| | | | |
|---|---|---|---|
| 2070485 | 8/1971 | France . | |
| 2549541 | 1/1985 | France | 494/7 |
| 2525280A | 12/1976 | Germany | 494/7 |
| 2551789A1 | 6/1977 | Germany | 494/8 |
| 2551788A | 6/1977 | Germany | 494/7 |
| 2713705A1 | 10/1977 | Germany . | |
| 2842575A1 | 4/1979 | Germany | 494/8 |
| 3002449A1 | 9/1980 | Germany | 494/7 |
| 3502252A1 | 7/1986 | Germany | 494/8 |
| 53-91465 | 8/1978 | Japan | 494/5 |
| 224476A | 1/1990 | Japan . | |
| 224477A | 1/1990 | Japan . | |
| 590086 | 7/1977 | Switzerland | 353/233 |
| 3022148 | 1/1981 | U.S.S.R. . | |
| 1087651A | 4/1984 | U.S.S.R. . | |
| 1335672 | 9/1987 | U.S.S.R. . | |
| 2076701 | 4/1981 | United Kingdom | 494/8 |
| 2100625 | 6/1982 | United Kingdom | 494/8 |

*Primary Examiner*—Joseph W. Drodge
*Attorney, Agent, or Firm*—Price, Heneveld, Cooper, DeWitt & Litton

[57] ABSTRACT

A method for removing insoluble materials from a liquid mixture, including spinning at least one centrifuge separator at a predetermined speed and pumping the mixture to the spinning centrifuge separator at a predetermined rate. The rate in which the mixture is pumped to the separator is varied in response to a variable angular moment of force in the centrifuge separator caused by density variations in the mixture. The method is carried out by an apparatus including at least one centrifuge separator coupled in fluid communication to at least one pump. A closed-loop feedback system is operably coupled to the devices driving both the separator and the pump to control the rate in which the mixture is supplied to the separator. The rate is determined by the angular moment of force in the separator which then allows the system to increase, maintain, or decrease the output of the pump. The apparatus further includes a system for temporarily storing the mixture and effluent discharged from the separator as well as a system for disposing of the insoluble materials.

6 Claims, 10 Drawing Sheets

U.S. PATENT DOCUMENTS

| | | | |
|---|---|---|---|
| 3,126,337 | 3/1964 | Smith | 175/266 |
| 3,289,775 | 12/1966 | Stone | 175/66 |
| 3,399,739 | 9/1968 | Goodwin et al. | 175/206 |
| 3,497,385 | 2/1970 | Steele et al. | 210/145 |
| 3,500,943 | 3/1970 | Bingman, Jr. | 175/66 |
| 3,713,499 | 1/1973 | Arscott et al. | 175/66 |
| 3,734,399 | 5/1973 | Oas et al. | 494/8 |
| 3,737,037 | 6/1973 | Bone, III | 175/66 |
| 3,738,490 | 6/1973 | Tigerman | 210/145 |
| 3,766,997 | 10/1973 | Heilhecker et al. | 175/206 |
| 3,774,702 | 11/1973 | Elenburg | 175/66 |
| 3,789,984 | 2/1974 | Gaylor | 209/505 |
| 3,893,525 | 7/1975 | Dower et al. | 417/15 |
| 3,923,241 | 12/1975 | Cyphelly | 494/7 |
| 3,964,557 | 6/1976 | Juvkam-Wold | 175/206 |
| 4,073,431 | 2/1978 | Jäger | 494/7 |
| 4,085,888 | 4/1978 | Jäger | 494/84 |
| 4,113,171 | 9/1978 | Cyphelly | 494/7 |
| 4,192,392 | 3/1980 | Messines et al. | 175/206 |
| 4,228,949 | 10/1980 | Jackson | 494/1 |
| 4,240,578 | 12/1980 | Jackson | 494/1 |
| 4,247,312 | 1/1981 | Thakur et al. | 175/206 |
| 4,298,162 | 11/1981 | Hohne | 494/84 |
| 4,303,192 | 12/1981 | Katsume | 494/7 |
| 4,369,915 | 1/1983 | Oberg et al. | 494/8 |
| 4,378,290 | 3/1983 | Kennedy, Jr. | 210/512.3 |
| 4,411,646 | 10/1983 | Cyphelly | 494/84 |
| 4,429,746 | 2/1984 | Allard | 166/291 |
| 4,432,747 | 2/1984 | Posse et al. | 494/8 |
| 4,468,154 | 8/1984 | Janssen et al. | 405/128 |
| 4,493,382 | 1/1985 | Collins et al. | 175/206 |
| 4,546,783 | 10/1985 | Lott | 175/66 |
| 4,577,999 | 3/1986 | Lindorfer et al. | 405/53 |
| 4,594,166 | 6/1986 | Clinton et al. | 210/145 |
| 4,668,213 | 5/1987 | Krämer | 494/8 |
| 4,793,423 | 12/1988 | Knol | 175/66 |
| 4,895,665 | 1/1990 | Colelli et al. | 210/710 |
| 4,919,822 | 4/1990 | Boulanger | 210/747 |
| 4,942,929 | 7/1990 | Malachosky et al. | 175/66 |
| 5,004,298 | 4/1991 | Boulanger et al. | 405/128 |
| 5,037,372 | 8/1991 | Weder | 494/84 |
| 5,109,933 | 5/1992 | Jackson | 175/66 |
| 5,129,468 | 7/1992 | Parmenter | 175/206 |
| 5,129,469 | 7/1992 | Jackson | 175/66 |
| 5,344,570 | 9/1994 | McLachlan et al. | 210/709 |

METHOD AND APPARATUS FOR CONTROLLING A PUMP UPSTREAM OF A CENTRIFUGE

This is a continuation of application Ser. No. 08/004,590, filed Jan. 14, 1993, now U.S. Pat. No. 5,344,570.

FIELD OF THE INVENTION

This invention relates generally to a method and apparatus for removing solids entrained in a liquid, and particularly to a method and apparatus for removing sand, silt, and clay-sized particles entrained in a drilling fluid.

BACKGROUND OF THE INVENTION

In surface drilling, a drill bit at one end of a drill rod is suspended from a traveling block in a drilling derrick and used to crush and cut a bore hole in the earth. The drilling derrick may be as much as 150 feet high and designed for loads of up to 600 tons. If a drilling operation is on a more limited scale, a collapsible mast on a mobile chassis may be used to suspend the drill string.

A square rod or kelly, suspended from the kelly bushing, engages a socket in a power-driven turntable which transmits rotary motion to the drill string and thus to the drill bit attached to the end of the string. The drill rod and extensions are typically hollow. During drilling, a fluid is pumped down through the rod which rises to the surface through the annular space between the rod and the wall of the bore hole. The liquid, which in most instances consists of water to which certain substances are added to increase its specific gravity, is referred to as "drilling mud" and is kept in circulation in the bore hole by a pump. The drilling mud cools the drill bit and removes cuttings from the bottom of the drill hole by carrying them to the surface in the annular space between the drill string and the bore hole wall.

On emerging at the surface, the drilling mud is passed through a vibrating screen or "shale shaker" to remove the course debris. The remainder of the drilling mud is deposited in a tank where the sand and silt-sized particles are removed by a series of cyclonic separators; one set to remove the sand-sized particles, and another set for the silt-sized particles. The drilling mud is then moved to a settling tank before being circulated to a suction pit and pumped back down the bore hole.

At one time, the principal surface feature of the drilling mud circulating system was merely a pit, called a reserve pit, dug in the ground adjacent the well. The reserve pit had little to do with fluid circulation, except for the special occasion when the drilling mud was circulated through the reserve pit. Reserve pits were mostly used as a depository for waste fluid and cuttings. In many instances, the only provision for fluid transfer from the reserve pit to the active system was by a small pump. However, because of ever-increasing environmental concerns, many state agencies have banned the use of in-ground reserve pits.

Today, in place of in-ground reserve pits, extra tanks are being used. The drilling fluid is slowly circulated through the tanks to allow solids to settle out. The sediment is then scooped or flushed from the tanks and loaded on trucks so the debris may be deposited in a special landfill. Because the drilling mud is circulated through the tanks, water supplies are better defined and closely calculated.

Recent drilling mud circulation systems have used centrifuge separators to remove the solids while retrieving a substantial portion of the water. A problem with such systems is their inability to adjust to irregular densities of solids carried by the drilling mud. A large influx of solids into the centrifuge separators produces a sharp increase in torque on the system, sometimes resulting in a shearing of the drive mechanism. When this occurs, the entire drilling process must stop until the circulation system is brought back on-line.

There has been a long-felt, yet unresolved need, to adjust to varying densities to avoid extreme torque which could damage the separators. Moreover, a need also exists for a system wherein any one of a number of compartments or tanks may selectively receive and temporarily store untreated or treated drilling mud to be used in the drilling operation in order to provide a continuous and sufficient supply of clean drilling mud. Lastly, there has been a long-felt, yet unresolved need, for a system to remove cuttings from the drilling mud wherein the cuttings may be disposed in landfills without the need for special permits since the cuttings are substantially free of hazardous or undesirable contaminants.

SUMMARY OF THE INVENTION

A method and apparatus are disclosed for treating a fluid mixture by removing substantially all of the insoluble material therefrom. According to one aspect of the method, the invention includes rotating or spinning at least one separator at a predetermined speed and pumping the mixture into the separator to remove the insolubles from the liquid. The rate at which the mixture is pumped to the separator is controlled in response to the angular moment of force experienced by the separator upon receipt of the mixture. The amount of the mixture introduced into the separator is controlled so that the separator will operate at its optimum efficiency, thus removing a substantial portion of the insoluble material from the fluid. The insoluble material is disposed in a container for later treatment and/or disposal.

Another aspect of the invention includes the solids control system itself. In one embodiment, the solids control system includes at least one centrifuge separator coupled in fluid communication with a pump. The pump, in turn, is in fluid communication with a source of the mixture to be treated. A closed-loop feedback system is operably coupled to the driving devices running the centrifuge separator and pump. The feedback system monitors the angular moment of force, or torque, experienced by the centrifuge separator as the mixture is introduced therein. The rate at which the mixture is pumped to the separator is controlled in response to the monitored torque, so that the centrifuge separator operates efficiently.

According to yet another aspect of the invention, the solids control system includes a tank having a plurality of compartments, each selectively in fluid communication with the pump. The compartments may also be in fluid communication with each other to maintain a constant fluid level in the tank. Similarly, each compartment is selectively in fluid communication to receive either the mixture from the source or the effluent produced from the centrifuge separator. The fluid in any one of the compartments may be decanted and subsequently reused or disposed. The insoluble materials removed from the mixture may also be post-treated and prepared for subsequent use or disposal.

According to yet another embodiment of the invention, the centrifuge separator may be located over a container wherein the insoluble materials discharged from the separator may be conveyed to a solidification unit. The solidification unit mixes the insoluble material with lime, portland cement powder, or other material to bind any remaining fluid in the material and stabilize the material for subsequent use and/or disposal.

The method and apparatus of this invention provide several advantages and benefits over prior methods and systems. The method and apparatus substantially reduce the risk of damage to a centrifuge separator resulting from excessive torque by monitoring the torque as expressed by hydraulic pressure. In response to torque, the volume of drilling fluid pumped to the centrifuge separator is adjusted, allowing the separator to operate at its optimum efficiency. The invention also reduces the number of settling pits used in such operations since in-ground reserve pits have been banned in many regions of the world. The method and apparatus provide a much more efficient cleaning while recovering a substantial portion of the fluid leading to a more economic use of water resources. Lastly, the method and apparatus of this invention substantially cleans the solids taken from the drilling fluid, removing a major portion of any contaminant, leaving the material suitable for disposal in conventional landfills.

BRIEF DESCRIPTION OF THE DRAWING FIGURES

A better understanding of the benefits and advantages provided by my invention may be obtained from the appended detailed description and drawings, wherein.

DETAILED DESCRIPTION OF ONE EMBODIMENT OF THE INVENTION

For purposes of the following description, the terms "upper," "lower," "right," "left," "rear," "front," "vertical," "horizontal" and derivatives thereof shall relate to the invention as oriented in each figure. However, it is to be understood that the invention may assume various alternative configurations, except where expressly specified to the contrary. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are not to be considered as limiting, unless the claims expressly state otherwise.

OVERALL SYSTEM

Figure 1:
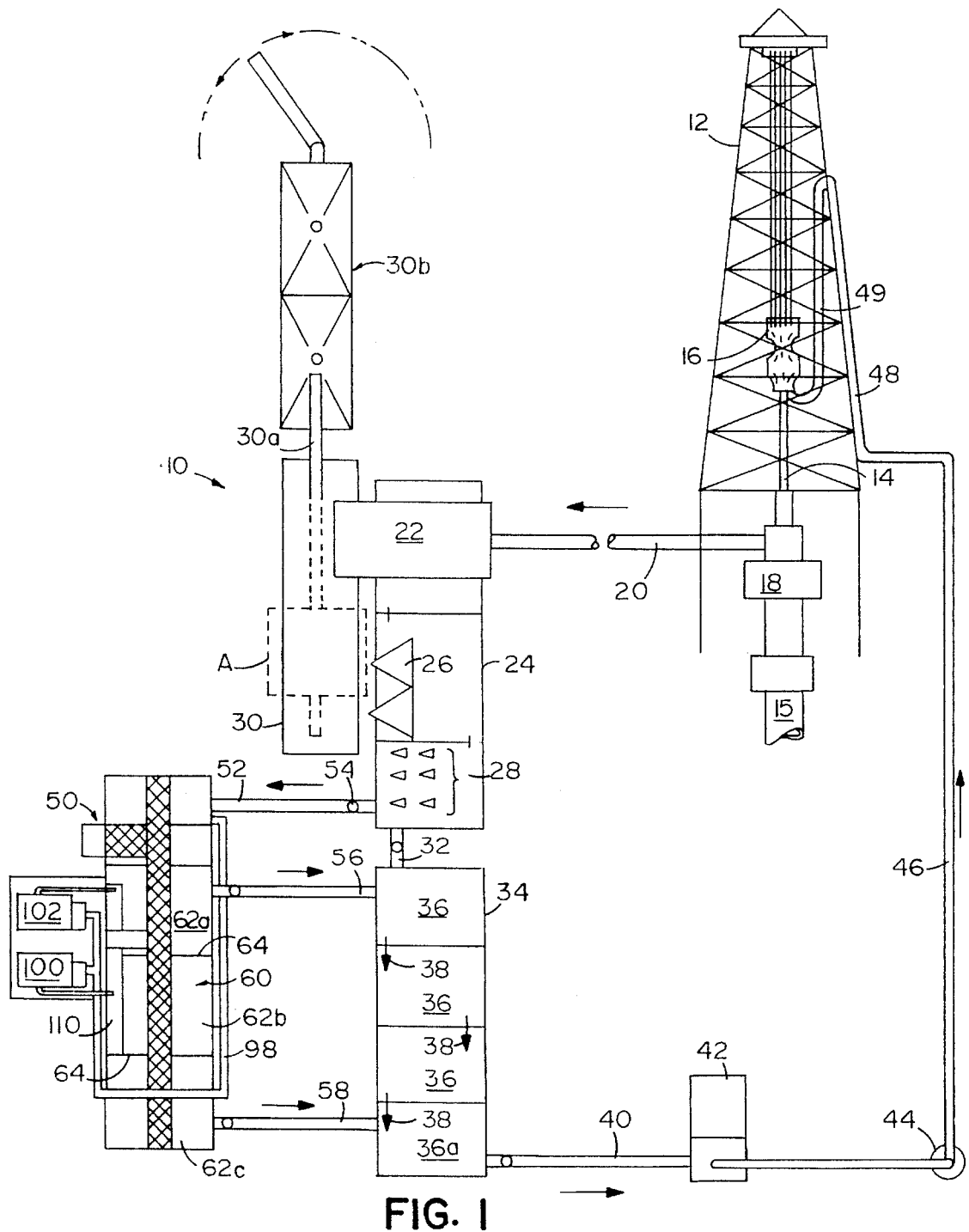
FIG. 1 is a generalized plan view of a drilling mud circulation system broadly encompassing the instant invention.

Referring to the drawing figures, like reference numerals will be used to indicate the same or like components, wherein FIG. 1 is a generalized plan view of a fluid circulating and solids control system 10 as preferably used in rotary drilling in the earth. A drilling tower or derrick 12 is used to suspend a drilling rod or string 14 from a traveling block and swivel 16. Drilling rod 14 concentrically passes through a larger diameter pipe or casing 15, and often a blowout preventer 18, used to prevent collapse of the bore hole wall and explosive eruption of the well caused by pressurized gas trapped in the subsurface. Drilling mud is pumped down the center of drill string 14 to cool and lubricate the drill bit, control bore hole pressure, and clean cuttings from the bottom of the bore hole during the drilling process. The returning drilling fluid passes up the bore hole in the annular space between drill string 14 and the bore hole wall or casing 15. Upon reaching the top of casing 15, the drilling fluid flows through pipe 20 to a conventionally known shale shaker 22 mounted above shaker pit 24. Frequently, conventionally known cyclonic desanders 26 and desilters 28 are also provided. Together, shale shaker 22, desanders 26, and desilters 28 provide the first phase of solid removal from the drilling fluid, depositing Solid particles larger than clay in container 30.

Coupled in series fluid communication with shaker pit 24 through valved pipe 32 is a suction tank or pit 34. Suction pit 34 contains a plurality of compartments 36 placed in series fluid communication through weir gates or passages 38. The last compartment 36a of suction tank 34 is in fluid communication through pipe 40 with a mud mixing unit 42 where additives are introduced to the drilling fluid to increase the specific gravity, and decrease fluid loss into the walls of the bore hole. From mud mixing unit 42, the drilling fluid is forced by pump 44 through pipe 46, stand pipe 48, and kelly hose 49 back down drill string 14.

SOLIDS CONTROL SYSTEM

Coupled in fluid communication with shaker pit 24 and suction tank 34 is a solids control system 50. Solids control system (SCS) 50 is coupled through pipe 52 and pump 54 with the first two compartments of shaker pit 24 while pipes 56 and 58 interconnect the first and last compartments, respectively, of suction tank 34 with SCS 50. Drilling fluid is pumped to SCS 50 from shaker pit through pipe 52 and pump 54 or by pumps mounted on SCS system 50. The drilling fluid is treated and cleaned by SCS 50 and is introduced into suction tank 34, either through pipe 56 or through pipe 58, depending upon the demands on suction tank 34.

Figure 2:
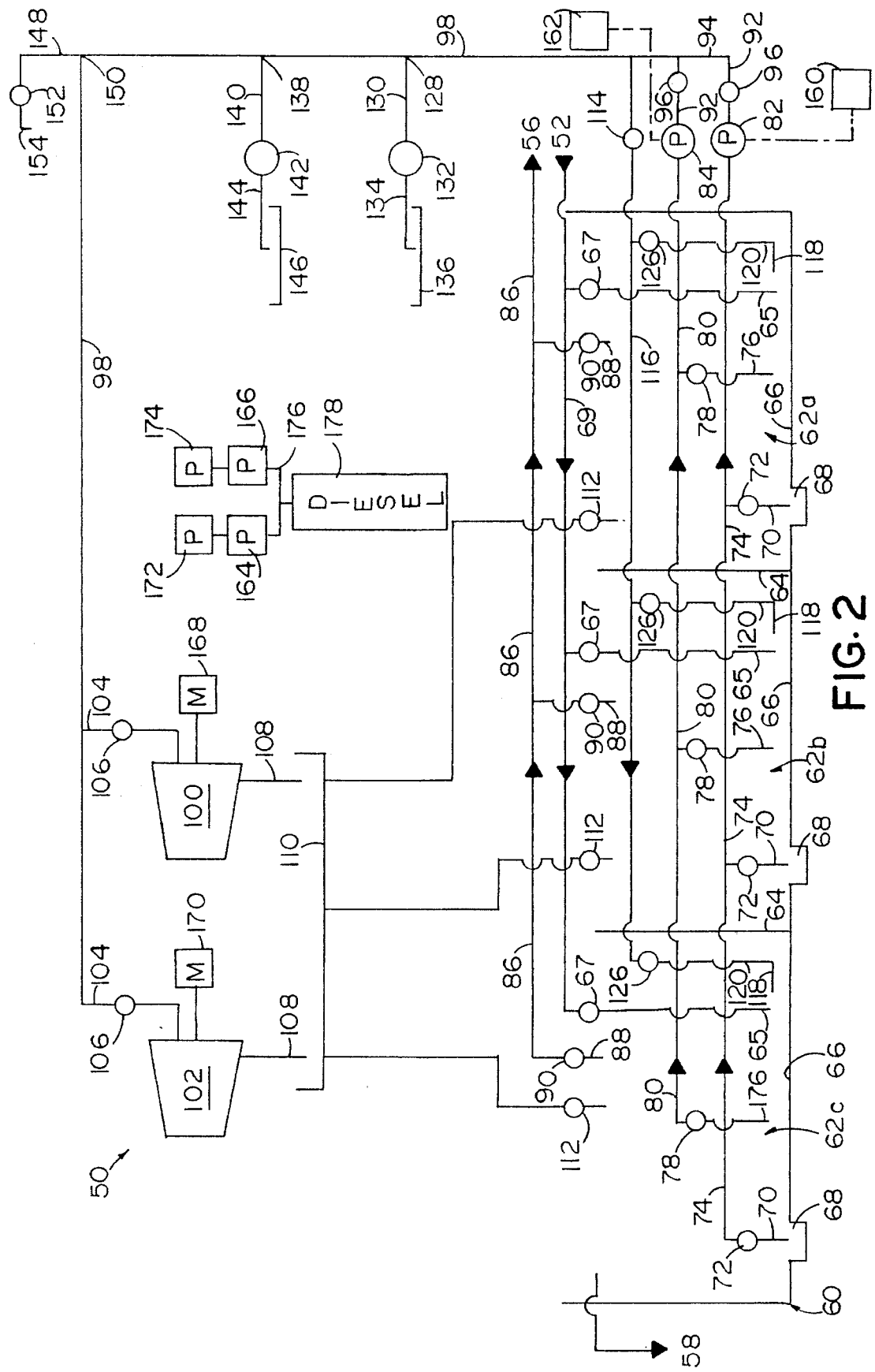
FIG. 2 is a schematic diagram of the primary components comprising the invention.

FIG. 2 is a schematic diagram of the fluid path and transfer lines comprising SCS 50 which includes a tank 60 containing at least three compartments 62a–62c separated by divider panels 64. Defined in a floor 66 of each compartment is a clean-out sump 68, the purposes of which are well known in the art. Each compartment 62a–62c is adapted to receive fluid through an inlet 65 terminating proximate floor 66 and coupled by a valve 67 to a pipe 69 extending substantially the length of tank 60. Pipe 69 is coupled in direct fluid communication with inlet 52 receiving fluid from shaker pit 24. Although any one of the compartments 62a–62c may receive fluid through pipe 69, it is preferred that valves 67 in compartment 62b and 62c be in the closed position a substantial portion of the time, while only compartment 62a receive the fluid from shaker pit 24.

Fluid may be selectively drawn from each sump 68 in compartments 62a–62c through a suction inlet 70 interconnected by a valve 72 to a suction line 74. Alternatively, fluid may be selectively drawn from each compartment 62a–62c through a second suction inlet 76, controlled by valve 78 coupled to suction line 80. Both suction lines 74 and 80 extend substantially along the length of tank 60 and terminate at one end in compartment 62c. The opposite ends of each suction line 74, 80 are coupled to a respective centrifugal pump 82, 84, adjacent compartment 62a.

Fluid may also be selectively drawn from each compartment 62a–62c through a pipe or trough 86 which is in fluid communication with each compartment 62a–62c through an inlet 88 controlled by a valve or weir gate 90. The outlet of pipe 86 is coupled in fluid communication with pipe 56 which interconnects tank 60 to the front compartment 36 of suction pit 34. Alternatively, fluid may be drawn directly from compartment 62c through pipe 58 and supplied either to compartment 36a in suction pit 34, or to mud mixing unit 42 through pipe 40.

Each centrifugal pump 82, 84 has a discharge line 92 joined to a common outlet pipe 94 through valves 96. Outlet pipe 94 is, in turn, coupled in fluid communication to conduit 98 which supplies fluid to separators 100, 102 through parallel pipes 104. Each pipe 104 includes a valve 106 for selectively allowing fluid in pipe 98 to each centrifuge separator 100, 102. The fluid supplied through conduit 98 and pipes 104 is cleaned by centrifuge separators 100, 102 and returned to tank 60 through discharge lines 108 to trough 110. The fluid within trough 110 may then be directed to any one compartment 62a–62c through a gate 112 above each compartment.

Figure 7:
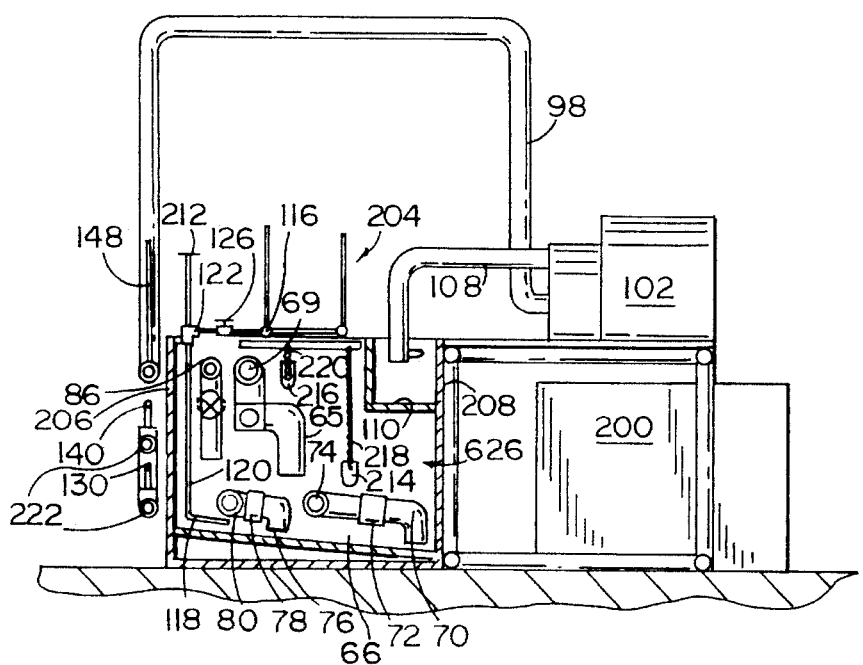
FIG. 7 is a transverse section view taken along line VII—VII in FIG. 4.

Tied to discharge line 94 through valve 114 is a high pressure line 116 which extends substantially the length of tank 60. Interconnected to pipe 116 and extending into each compartment 62a–62c is an agitation nozzle 118 located at the bottom of a vertical pipe 120 which in turn is coupled to an elbow 122 by a concentrically pivoting coupling 124 (FIG. 7). Elbow 122 is, in turn, interconnected by valve 126 to pipe 116. The orientation of nozzle 118 within each compartment 62a–62c is controlled by an operator using a handle connected to each vertical pipe 120.

As will be more fully explained below, coupled to conduit 98 at junction 128 is a fluid line 130 having an opposite end coupled to a centrifugal pump 132. Pump 132 in turn has a suction line 134 adapted to draw from a reservoir 138 adjacent tank 60 and containing a fluid additive such as an acid. Similarly, coupled at junction 138 in conduit 98 is a second fluid line 140 having an opposite coupled to centrifugal pump 142. Pump 142 includes a suction line 144 to draw from reservoir 146 also containing an additive such as a polymer. The fluid in conduit 98 may be sampled through nozzle 154 at the end of pipe 148 coupled at junction 150 and controlled by valve 152.

Centrifugal pumps 82 and 84 are powered by hydraulic motors 160 and 162, respectively, and described in greater detail below. Each hydraulic motor 160 and 162 is driven through a closed loop hydraulic line coupled to a respective variable displacement hydraulic pump 164 and 166. Also, more fully explained below, each centrifuge 100, 102, is powered by a respective hydraulic motor 168, 170, also driven through a closed loop hydraulic line coupled to a respective variable displacement hydraulic pump 172 and 174. The four variable displacement hydraulic pumps 164, 166, 172 and 174, are driven by a transmission 176 coupled to a diesel engine 178.

TANK

Referring to FIGS. 3–7, tank 60 is preferably rectangular having a length of approximately 40 feet, a width of approximately 8 feet, and a height of approximately 6 feet. Tank 60 is preferably made from steel and built on a conventional or well known tubular steel platform. The interior of tank 60 is preferably rectangular and divided transversely into at least three compartments 62a–62c by divider panels 64. Elevated by deck 190 at one end 192 of tank 60 are storage tanks 146, 194 for storing fuel, hydraulic oil, and additives for the drilling fluid. Located below deck 190 on platform 196 are diesel motor 178, hydraulic pumps 164, 166, 172 and 174, hydraulic motors 160, 162, and centrifugal pumps 82, 84, 132, and 142 described above. Adjacent tank 60 and supported on skid 198 separate from tank 60, is at least one, and preferably two, centrifuge separators 100, 102 powered by respective hydraulic motors 168 and 170, also described earlier. As described above, each separator 100, 102 is selectively coupled in fluid communication through pipes 104 and valves 106 with conduit 98 which, in turn, receives fluid from centrifugal pumps 82 and/or 84 drawing from one of the three compartments 62a–62c. Fluid discharge lines 108 from separators 100 and 102 return fluid to any one compartment 62a–62c through gated trough 110. Disposed directly below centrifuge separators 100, 102 and within skid 198 is a removable bin 200 to receive cuttings or solids removed from the fluid by the separators.

Located along the top of tank 60 adjacent storage tank 194 is a control panel 202 which allows the operator to control the rate at which fluid is supplied through conduit 98 to centrifuge separators 100 and 102. Through control panel 202, the operator can also control the rotation rate of centrifuge separators 100 and 102. The operator accesses panel 202, and may directly observe the fluid levels in each compartment 62a–62c along catwalk 204, which runs the length of tank 60. From catwalk 204, the operator may open or close valves 67 in inlet pipe 69, suction inlet valves 72 and 78 in suction inlets 70 and 76, inlets 88 in pipe 86, valves and weir gates 90 and gates 112 in trough 110. The operator may also access valves 126 coupling high pressure line 116 to agitation nozzles 118.

Figure 6:
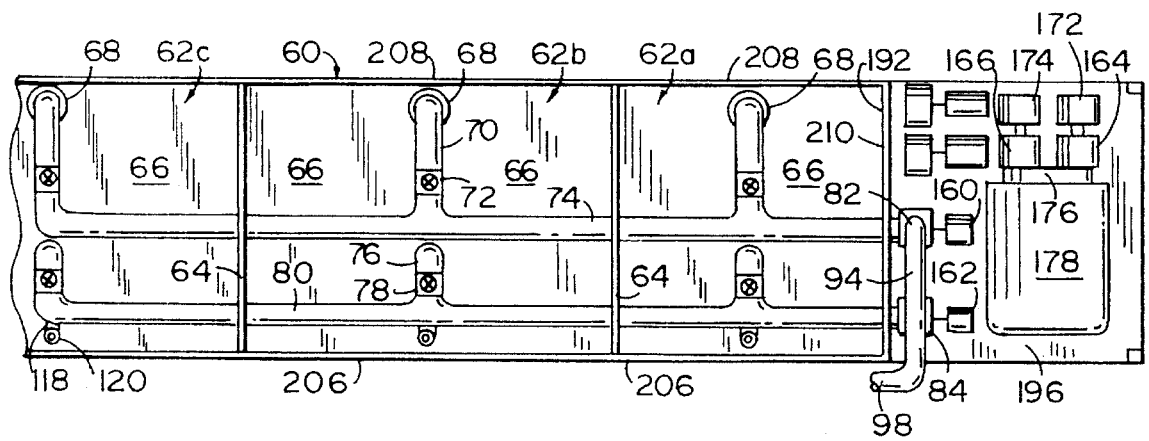
FIG. 6 is a fragmentary, sectional plan view of the solids control system taken along line VI—VI in FIG. 4.

Referring specifically to FIGS. 6 and 7, each compartment 62a–62c has a floor 66 which slopes downwardly from side wall 206 to an opposite side wall 208. Sump 68 is located in floor 66 proximate wall 208 and midway between compartment end walls or divider panels 64. Sloping floor 66 and sump 68 provide an incline down which solids may flow and be concentrated within each compartment 62a–62c.

Extending the length of tank 60 from end 192 and terminating in compartment 62c are suction lines 74, 80. As shown, suction lines 74 and 80 are parallel to each other and lie proximate floor 66. In each compartment, suction line 74 includes a suction inlet line 70 having its open end located in sump 68 and controlled by valve 72. Similarly, suction line 80 includes suction inlet 76 controlled by valve 78. The open end of each suction inlet 76 is located adjacent floor 66 and generally in the center of each compartment 62a–62c. The ends of suction lines 74, 80, extending through end wall 210 of compartment 62a, are coupled in fluid communication to dedicated centrifugal pumps 82 and 84, respectively (FIG. 6) mounted to platform 196. High pressure discharge line 92 from each centrifugal pump 82, 84 is interconnected to pipe 94 through valves 96 (shown in FIG. 2). Pipe 94 is, in turn, coupled directly to conduit 98 located on the exterior side of wall 206 forming tank 60.

Also located adjacent floor 66 in each compartment 62a–62c is agitation jet or nozzle 118 (FIG. 7). Nozzle 118 pivots about vertical shaft 120 coupled to elbow 122. Valve 126, in turn, couples elbow 122 to high pressure line 116 comprising one support for catwalk 204. High pressure line 116 (FIG. 2) is coupled in fluid communication through valve 114 with outlet pipe 94 extending from the high pressure side of centrifugal pumps 82, 84. A handle 212 coupled to vertical pipe 120 is used to direct nozzle 118 within each compartment 62a–62c.

Each compartment 62a–62c is selectively in fluid communication with an adjacent compartment through several avenues. Each divider panel 64 contains at least two gates 214, 216 (FIG. 7) for the purpose of maintaining constant fluid levels between adjacent compartments. Gate 214 is preferably located approximately on the bottom of wall 64 from floor 66. A length of chain 218 extending from gate 214 is attached to a bar and crank (not shown) for the purpose of opening and closing the gate. Gate 216 is located approximately two-thirds of the way up divider wall 64 and is connected by a similar chain 220 to a separate bar and crank for the same purpose.

A second avenue of fluid communication between compartments 62a–62c is through trough 110 located along the upper edge of tank wall 208 (FIG. 7). As mentioned earlier, trough 110 receives the effluent or discharge from centrifuge separators 100 and 102. Weir gates 112 (FIGS. 3 and 5) may be manually raised or lowered to allow the effluent in trough 110 to enter any one of the compartments. Likewise, pipe 86 (FIGS. 5 and 7) located along the upper edge of tank wall 206 may allow water in each compartment 62a–62c to flow through inlets 88 and valves 90 to another compartment 62a–62c. As described earlier, the purpose of pipe 86 is to direct water from any one of the compartments 62a–62c to pipe 56 coupled to the front of suction tank 34. Located adjacent pipe 86 and running substantially the length of tank 60 is pipe 69 (FIGS. 5 and 7) coupled in fluid communication to inlet pipe 52 extending from shaker pit 24. In each compartment, pipe 69 has a downwardly extending inlet 65. Fluid in pipe 69 discharged through each inlet 65 is controlled by valve 67 (FIG. 5) accessible by the operator from catwalk 204 described earlier.

Referring again to FIG. 4, the portion of conduit 98 fixed to the outer wall 206 of tank 60 includes several substantially equal lengths of pipe 222 interconnected in series by right-angle elbows 224 to run conduit 98 in a serpentine fashion along the exterior of wall 206. In fluid communication with a lowermost conduit 222 at junction 128 is one end of line 130, the opposite end of which is coupled in fluid communication with a centrifugal pump 132 used to introduce a chemical additive such as an acid to the fluid in conduit 98 from a container 136 (see FIG. 2). Similarly, coupled in fluid communication with conduit 98 at junction 138 is a second line 140, having an opposite end coupled to centrifugal pump 142, which is coupled in fluid communication through line 144 with tank 146 on top of tank 60. Line 140 provides a chemical additive, such as a polymer, from tank 146 to the fluid in conduit 98. The chemical additives are thoroughly mixed in the fluid by the serpentine configuration of conduit 98. Fluid samples may be taken from the uppermost section of pipe 222 through pipe 148 at valve 152.

Figure 8:
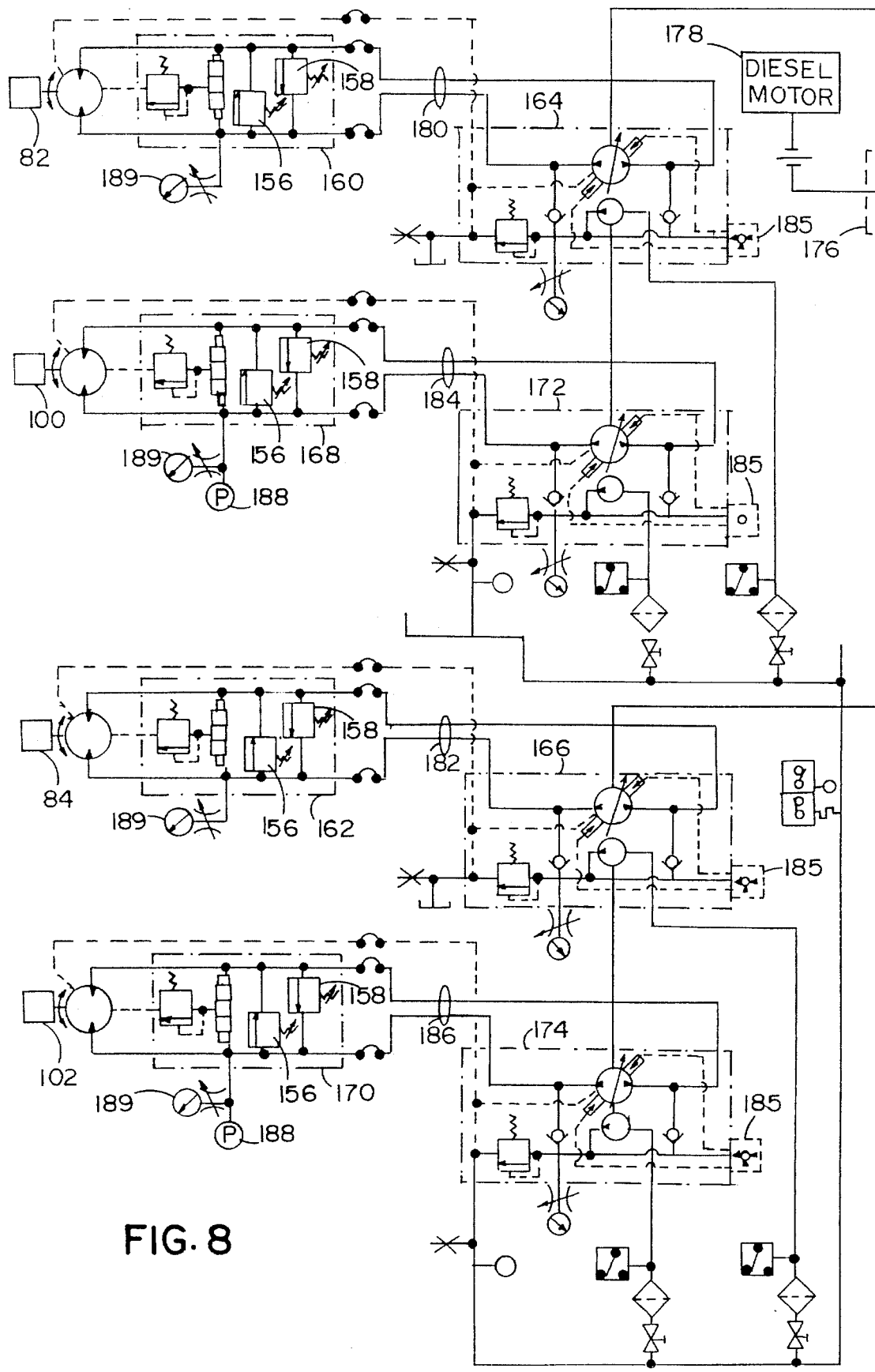
FIG. 8 is a schematic diagram of a hydraulic system used in this invention.

Referring now to FIGS. 6 and 8, diesel motor 178 is mounted with a two-hole pump transmission 176 which powers parallel shafts upon which are mounted hydraulic pumps 164, 166, 172 and 174. Transmission 176 may be a KD01-series drive made by Terrell Gear Drives. Hydraulic pumps 164, 166 are preferably 50 horsepower, variable-displacement hydraulic pumps, Model 90L055 manufactured by Sundstrand-Sauer, Inc. of Ames, Iowa. Pumps 172 and 174 are preferably 40 horsepower, variable-displacement hydraulic pumps such as Model 90L042 also manufactured by Sundstrand-Sauer, Inc.

Centrifugal pumps 82, 84 are each powered by a respective hydraulic motor 160, 162, such as Model FV1139 manufactured by Volvo Hydraulics, Inc. It is preferred that hydraulic motor 160 be coupled in a closed hydraulic loop through hydraulic lines 180 (FIG. 8) to variable displacement hydraulic pump 164 while hydraulic motor 162 is similarly coupled through hydraulic lines 182 (FIG. 8) to variable displacement hydraulic pump 166. The amount of hydraulic fluid displaced by each variable displacement hydraulic pump 164, 166 to its respective motor 160, 162 is controlled by a servo-valve or electrical displacement control (EDC) valve 185 which, in turn, controls the displacement of a swash plate in each pump 164, 166.

Figure 3:
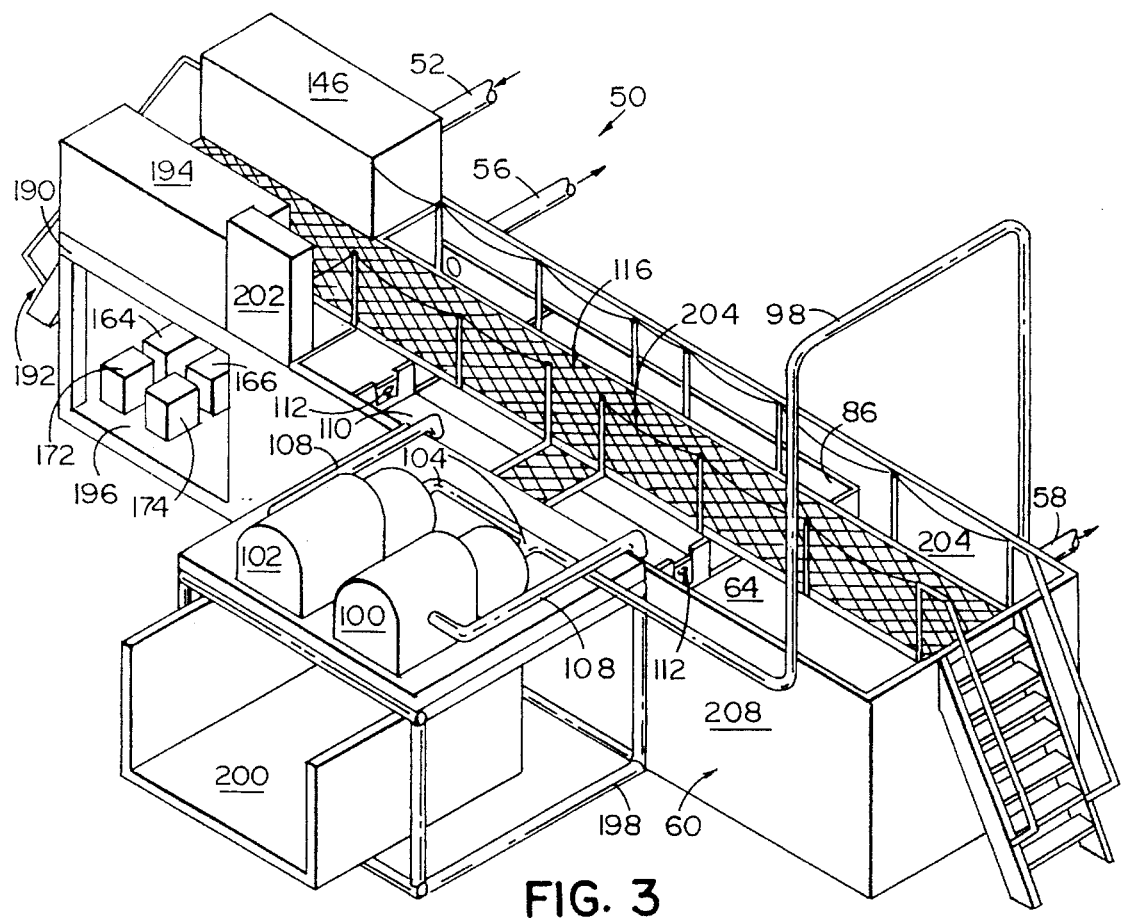
FIG. 3 is an oblique view of one embodiment of a solids control system forming a part of the invention.

Variable displacement pumps 172, 174, coupled in series drive relationship with variable displacement hydraulic pump 164, 166, respectively, are dedicated to operate a respective hydraulic motor 168, 170 driving centrifuge separators 100, 102 described earlier. It is preferred that each centrifuge hydraulic motor be Model FV1158 also made by Volvo Hydraulics, Inc. Each centrifuge hydraulic motor 168, 170 is coupled by a closed hydraulic loop through lines 184, 186, respectively (FIG. 8), to pumps 172, 174. The pressure of hydraulic fluid supplied by each pump 172, 174 to its respective motor 168, 170, is monitored by a pressure transducer 188 (FIG. 8) and pressure gauge 189. The displacement of hydraulic fluid by pumps 172, 174 is also variable and controlled in a similar manner as pumps 164, 166 through an EDC valve such as 185. It should be also noted that each hydraulic motor 160, 162, 168 and 170, includes a first and second crossover relief valve 156 and 158, respectively. Each crossover relief valve 156, 158 is coupled in fluid communication across the hydraulic lines providing fluid to and from each hydraulic motor. Actuation of one or both of the relief valves 156, 158 results in an immediate withdrawal of hydraulic power from the variable displacement hydraulic pump to its respective hydraulic motor. Since the hydraulic circuit interconnecting each pump to its respective motor is a closed loop, a large reservoir of fluid is theoretically unnecessary. However in reality, a small hydraulic reservoir is provided in storage tank 194 on deck 190 (FIG. 3).

SEPARATORS

Figure 9:
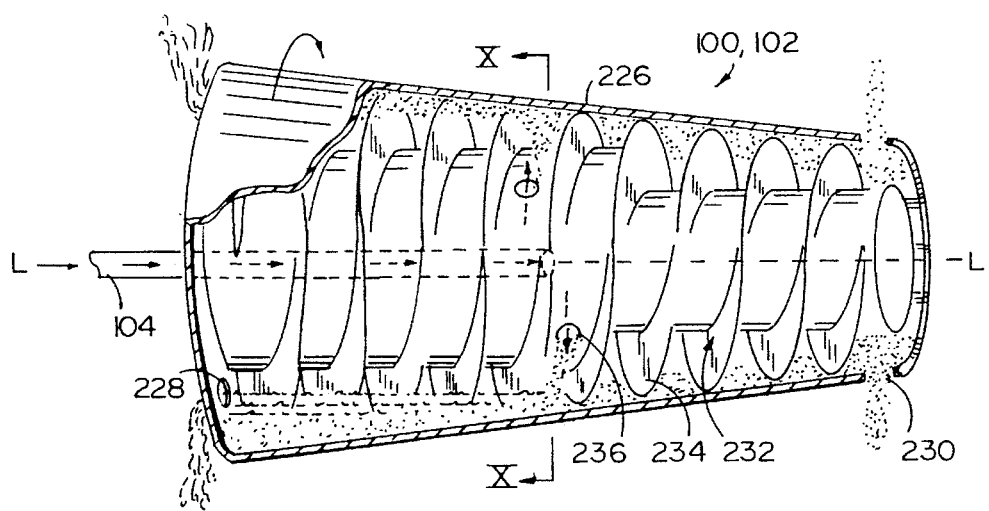
FIGS. 9 and 10 are sectional views of a typical centrifuge separator used in connection with the solids control system.
Figure 4:
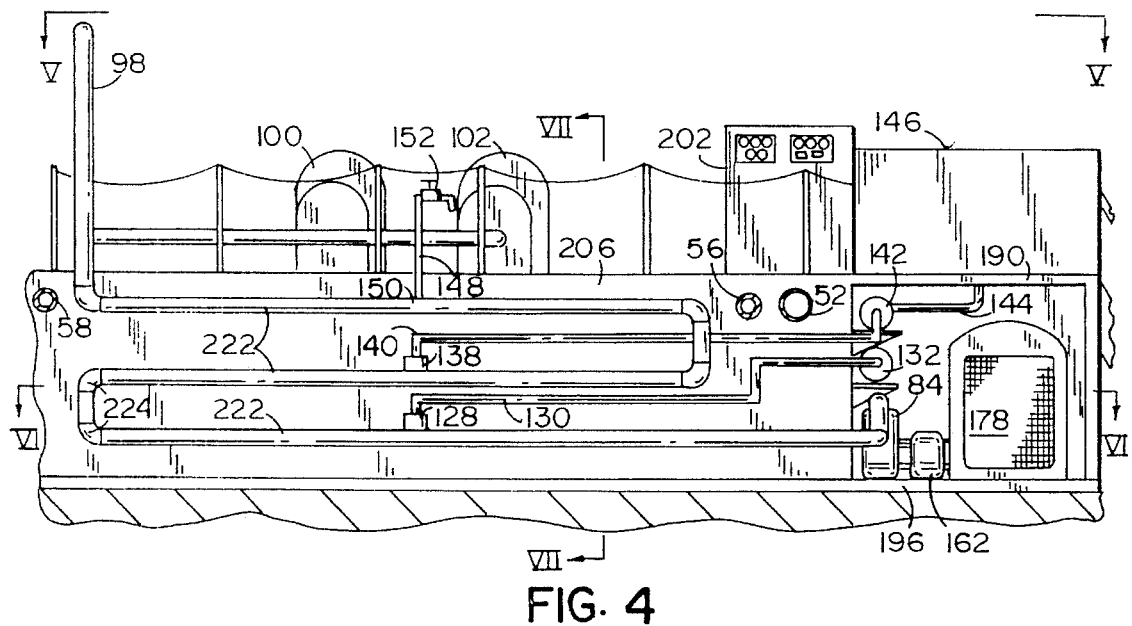
FIG. 4 is a fragmentary, elevational view of the solids control system shown in FIG. 3.
Figure 5:
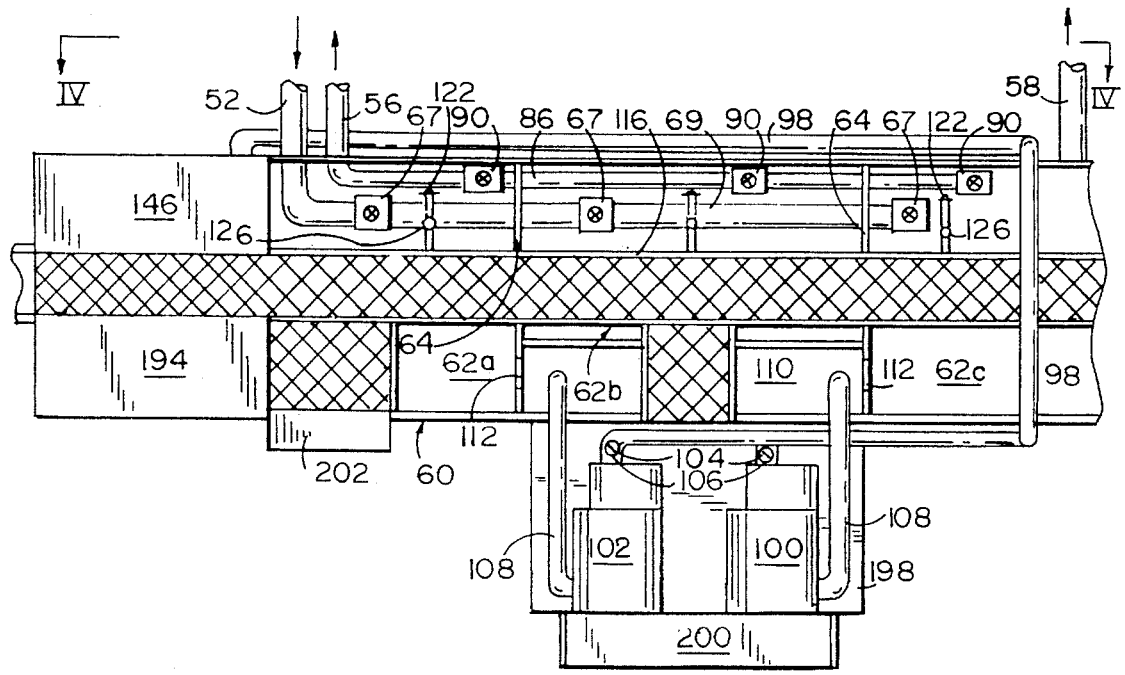
FIG. 5 is a fragmentary, plan view of the solids control system taken along line V—V in FIG. 4.
Figures 10, 11:
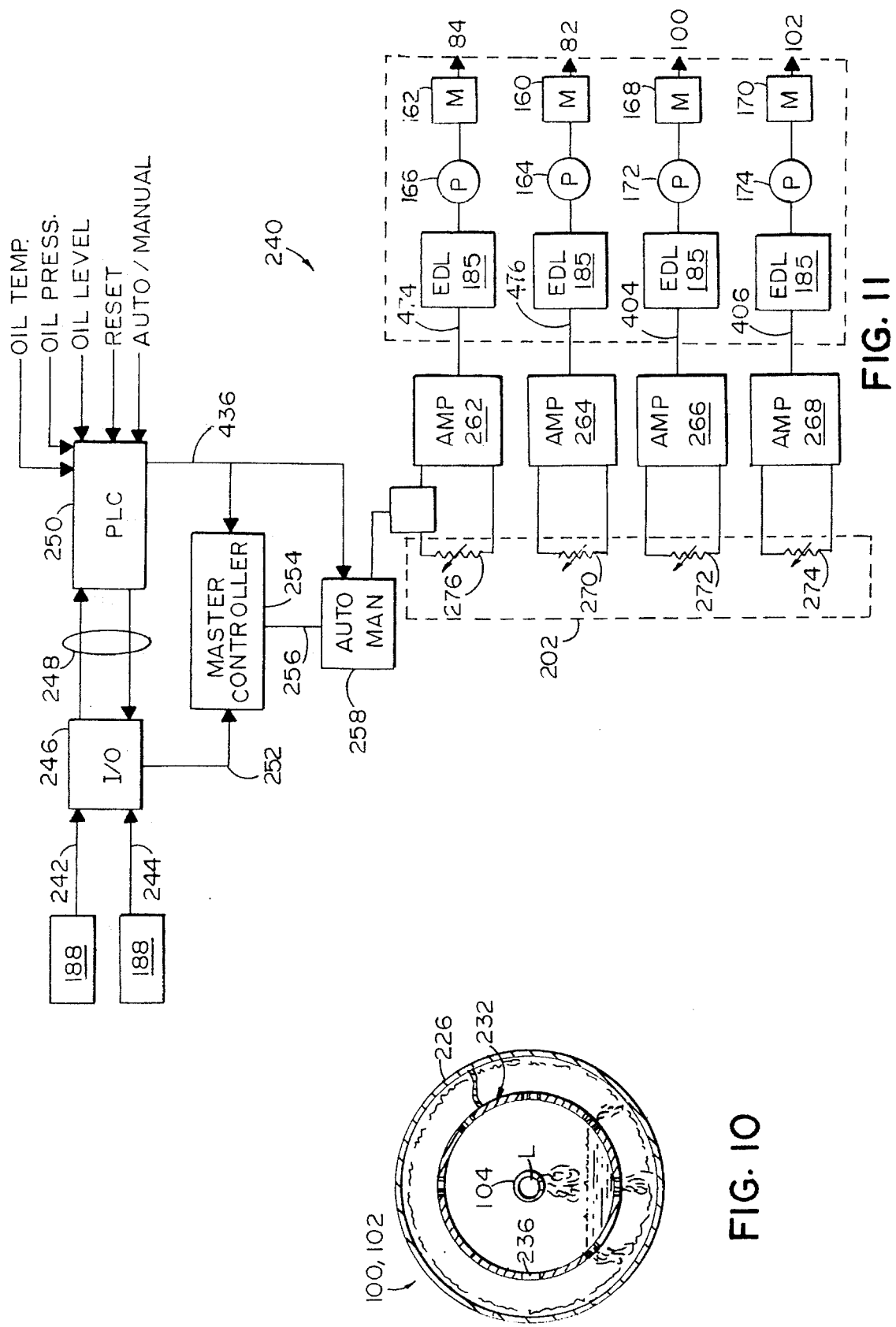
FIG. 11 is a block diagram illustrating a control system used in the invention.

Referring to FIGS. 9 and 10, each centrifuge separator 100, 102, generally includes an outer, conically-shaped bowl 226 which spins about its longitudinal axis L at a speed variable between several hundred and three thousand RPM depending upon the transmission and drive mechanism. Located at the large end of conical bowl 226 is a clay/liquid discharge port 228 while a coarse solids discharge port 230 is located at the opposite smaller end. Concentrically disposed within bowl 226 is a screw conveyor 232 wherein the screw thread 234 has an outside diameter slightly less than the inside diameter of bowl 226. Conveyor 232 rotates in the same direction as bowl 226 but at a lower speed to convey the coarse solids toward discharge port 230. For example, conveyor 232 may complete one revolution for every fifty revolutions made by bowl 226. Bowl 226 and conveyor 232 cooperate to separate solids from a fluid introduced through a feed line, such as 104 described above, terminating concentrically within conveyor 232. Inlet ports 236 pass transversely through the midway point of conveyor 232 to allow the fluid from lines 104 into bowl 226. As bowl 226 rotates, a centrifugal force on the order of several hundred Gs are created, throwing particles larger than two to five microns against bowl 226 while particles smaller that two to five microns are contained in a region inside bowl 226. The larger and heavier particles are conveyed to coarse solids discharge port 230 while the smaller and lighter particles move down the incline of the conical bowl 226 to clay/liquid discharge port 228. In the illustrated embodiment, centrifuge separators 100, 102, are designated Broadbent HV-24s available from Northern Solids Control and Service, Inc. of Mancelona, Mich.

CONTROL SYSTEM

FIG. 11 is a generalized block diagram of a control system 240 which assists in controlling the rate at which fluid is taken from tank 60 and sent to centrifuge separators 100, 102. Pressure transducers 188, mentioned earlier, are each placed in fluid sensing relationship in one of the hydraulic lines 184, 186 coupled to a respective hydraulic motor 168, 170 driving respective centrifuge separators 100, 102. Each pressure transducer 188 is operably coupled by conductors 242, 244 to analog input/output unit (I/O) 246 within control panel 202. The signal received from transducers 188 is converted to a digital signal by I/O 246 and sent over a bus 248 to a programmable logic controller (PLC) 250 wherein the received signal is compared to a limit set by a control program. If the signal from either transducer is greater than the programmed limit, I/O 246 outputs a scaled analog signal (0–10 V) over line 252 to master controller 254. In response to the scaled voltage signal received, controller 254 then outputs a signal on lines 256 to auto/manual circuit 258. In an automatic mode, PLC 250 enables automatic/manual circuit 258 which allows master controller 254 to output a signal through auto/manual circuit 258 to amplifier 262. Amplifier 262 outputs a current on line 474 to EDC valve 185c on variable displacement pump 166. EDC valve 185c controls pilot oil to the swash plate in variable displacement pump 166 which in turn controls hydraulic motor 162 (see FIG. 8).

In a manual mode, PLC 250 disables auto/manual circuit 258 and allows the operator to control the input voltage to amplifier 262 through potentiometer 276 mounted in control panel 202. Potentiometer 276 is used to control the input voltage to amplifier 262 to control EDC valve 185.

Amplifiers 264, 266 and 268 are manually controlled by the operator through potentiometers 270, 272 and 274 to control the displacement of oil by variable displacement pumps 166, 172 and 174 through respective EDC valves 185. Through potentiometers 272 and 274 located in control panel 202, the operator manually controls the displacement of hydraulic oil by pumps 172 and 174 to hydraulic motors 168 and 170 driving centrifuge separators 100 and 102, respectively.

CONTROL SYSTEM CIRCUITRY

Figure 12:
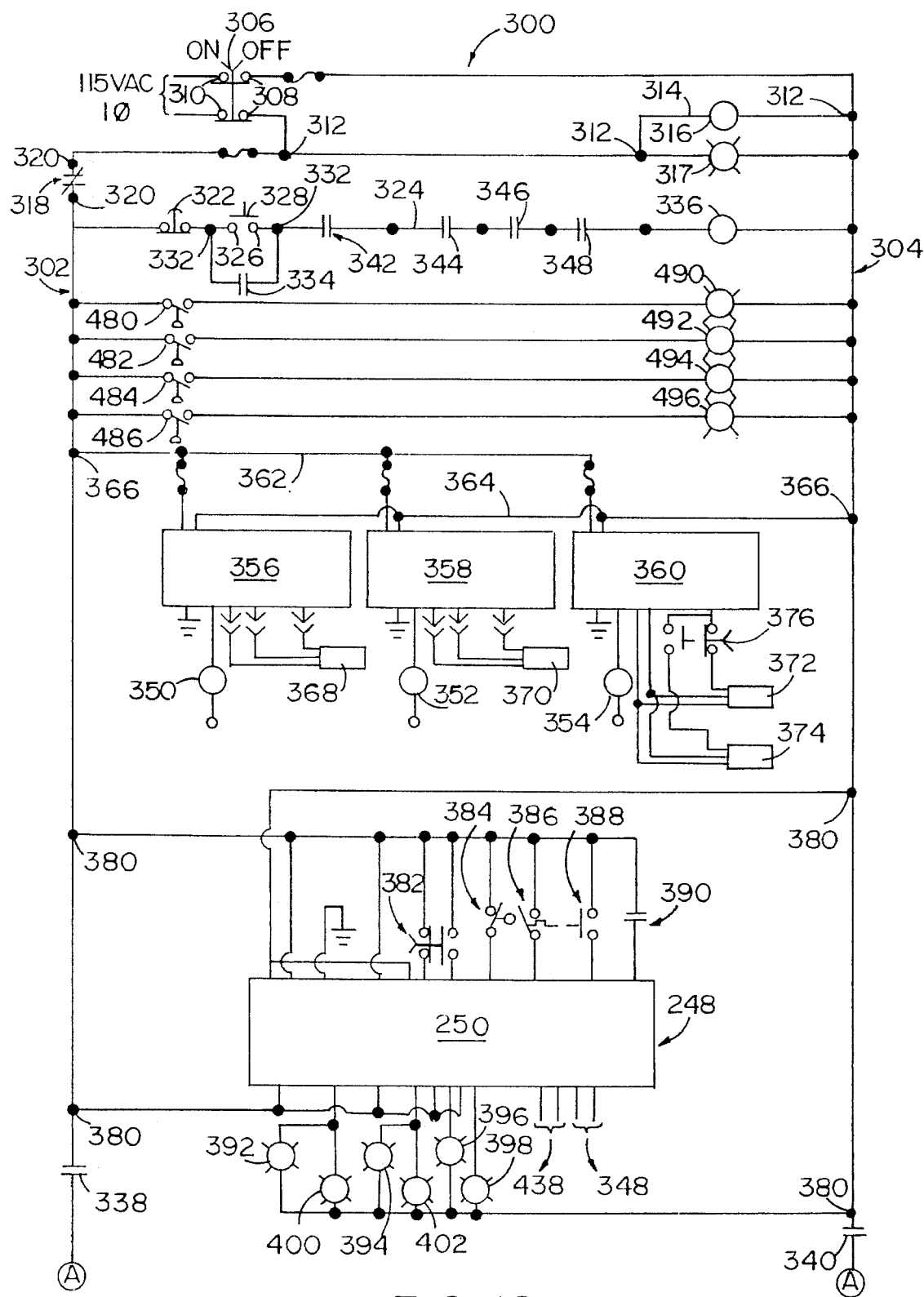
FIGS. 12–14 are a detailed schematic diagram of the control system shown in FIG. 11.
Figure 13:
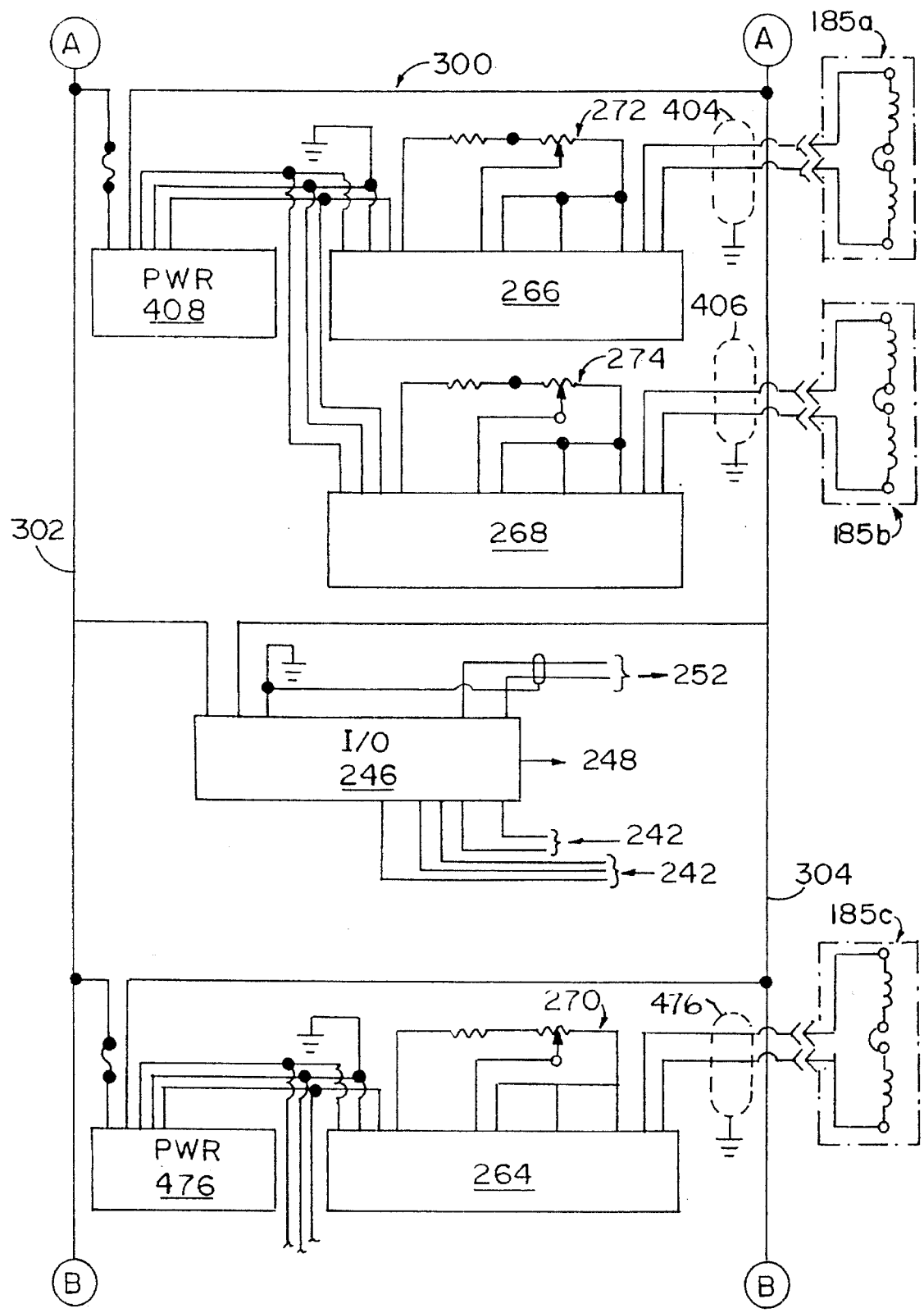
Figure 14:
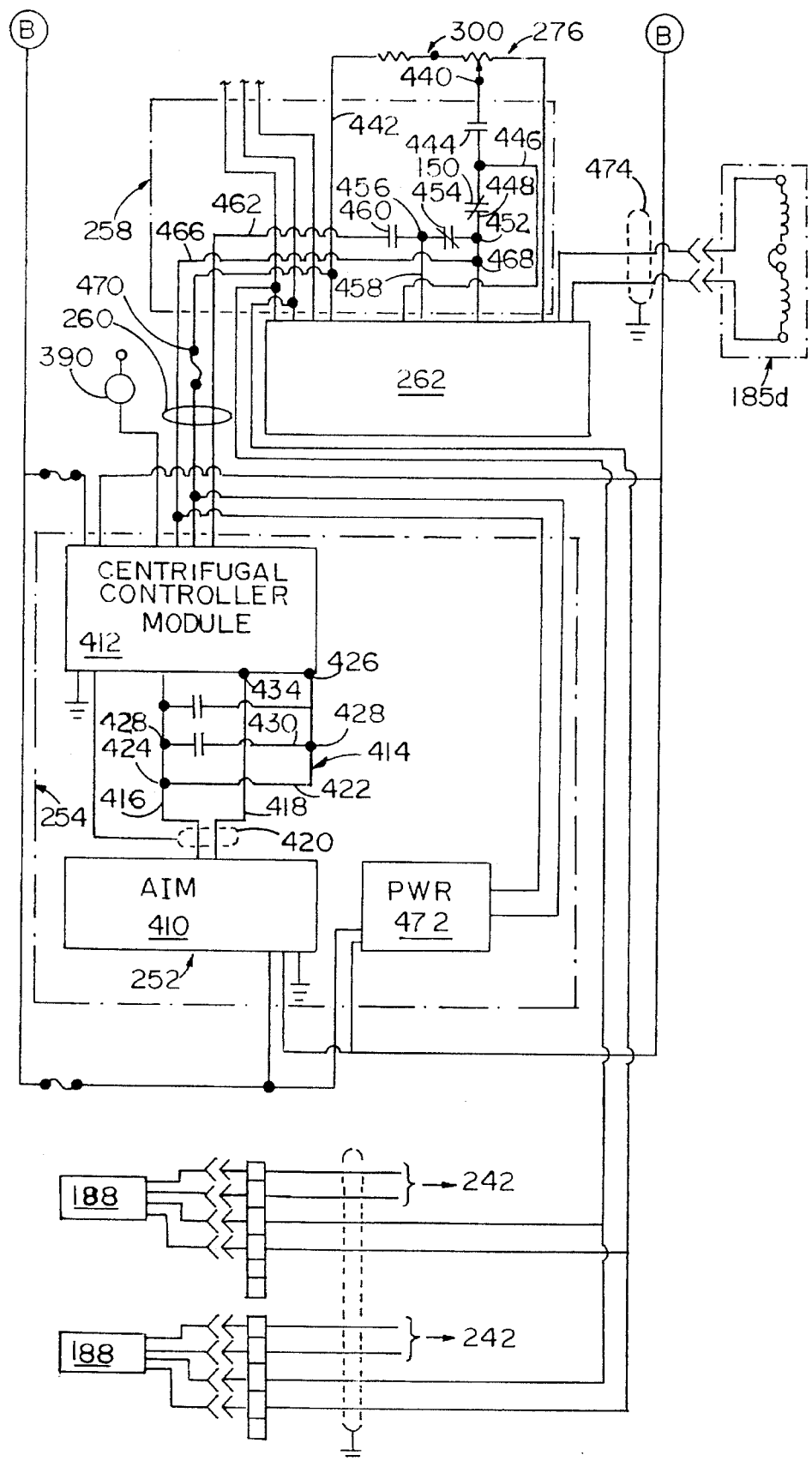

FIGS. 12–14 show in greater detail an electrical schematic diagram of the components 300 comprising the electrical portion of this invention. Essentially, the electrical schematic is a conventional ladder diagram wherein many of the components are operably coupled in parallel to electrical leads 302 and 304, which in turn are coupled to a 115 volt AC power supply through switch 306 opening and closing contacts 308 and 310.

Coupled at terminals 312 to line 314 and lead 304 is a relay coil 316 which controls relay contact 318 coupled by terminals 320 to line 302. A normally closed emergency "STOP" switch 322 provides continuity across contacts 326 in line 324. In series with switch 322 on line 324 is push button "START" switch 328 which is in the normally open position between contacts 330. In order to latch "START" switch 328, switch 328 is bridged at terminals 332 by one of three, normally open, master control relay (MCR) contacts 334 which is closed by master control relay coil (MCRC) 336 on line 324. Master control relay coil 336, once energized, also closes a second and third normally open MCR contacts 338 and 340 in leads 302, 304, respectively, shown toward the bottom of FIG. 12.

Also in series in line 324 is normally open relay contact 342 which is closed by an output from PLC 250. PLC 250 is energized when power switch 306 closes contacts 308, 310. Normally closed relay contacts 344, 346 and 348, in series in line 324, are controlled by respective solid state relay coils 350, 352 and 354, operably coupled to respective tachometer monitor and display modules 356, 358 and 360. Relays 350–354 are preferably solid state such as designated PM31S available from Dynapar, Inc. of Gurnee, Ill. Tachometer modules 354–358 are preferably models MTJR-1-S00, also available from Dynapar, Inc., and coupled in parallel through lines 362, 364 at terminals 366 to leads 302, 304, respectively. Modules 356 and 358 monitor the revolutions per minute (RPM) of hydraulic motors 168 and 170 through respective proximity sensors 368 and 370. It is preferred that module 360 monitor the RPM of hydraulic motors 160 and 162 powering centrifugal pumps 82, 84 through respective proximity sensors 372 and 374. Sensor 372 and 374 are operably coupled to module 360 through two position switch 376 to enable the operator to monitor the RPM of either motor 160 or 162 being used.

Coupled to leads 302, 304 at terminals 380 upstream of MCR switches 338 and 340, is PLC 250. In the illustrated embodiment, PLC 250 is a Model F2-20MR-UA1 programmable logic controller manufactured by Mitsubishi. PLC 250 receives input signals through three position switch 382 to select automatic, off or manual mode of operation, oil level switch 384, oil temperature switch 386, reset switch 388, and/or an over-pressure relay switch 390. In response to such inputs, PLC 250 outputs a voltage to light indicator lamps 392–398 and contact relay coils 400, 402. Additional output lines are coupled to PLC relay switch 342 described above while a second output signal is sent to master controller 254 to automatically or manually control centrifugal pump 82. A program for controlling PLC 250 is appended as Appendix A hereto.

Referring now to FIG. 13, circuit 300 below MCR switches 338 and 340 is responsible for carrying out command signals generated by the operator or PLC 250. As briefly described above, dedicated amplifiers 266 and 268, in response to the voltage settings of potentiometers 272 and 274, respectively, produce an output current over lines 404, 406 to dedicated EDC valves 185a, 185b mounted to variable displacement pumps 172 and 174. Amplifiers 266 and 268 are preferably powered by a single power supply 408 which converts the 115 volt AC power on leads 302, 304 to ±20 volts DC power. In the illustrated embodiment, amplifiers 266, 268 are Models D2408-150-100-101-60 manufactured by Datatran of Sussex, N.J. Power supply 408 is preferably Model B2396-111-150-401-1 also manufactured by Datatran.

Shown below amplifiers 266 and 268 and power supply 408 is an analog input and output device (IOD) 246 such as designated model F2-6A-E also manufactured by Mitsubishi (FIG. 13). IOD 246 is operably coupled to, and exchanges data with, PLC 250 through digital data bus 248. IOD 246 receives analog input signals produced by pressure transducers 188 (FIG. 14) over lines 242 and 244. The analog signals are converted to digital signals and sent over bus 248 to PLC 250 where a comparison is made between the actual hydraulic pressure monitored by transducers 188 and a programmed maximum. Based upon a digital output signal from PLC 250, a zero to ten volt analog signal is output over lines 252 to analog input module (AIM) 410 in master controller 254 to adjust the output of pump 84. Master controller 254 also includes a centrifugal controller module 412 such as Model MSJR-1-S-00 manufactured by Dynapar. Controller module 412 receives an input signal from AIM 410 through a circuit 414, which includes lines 416 and 418 protected by a shield 420. A jumper 422 interconnects line 416 at terminal 424 to controller terminal 426. Joined to line 416 at terminal 428 is line 430 which includes a relay contact 432 activated by automatic relay coil 400 (FIG. 12). When closed, relay contact 432 interconnects controller terminal 434 with line 416. In addition, a normally open PLC output relay contact 436, which is closed upon an output from PLC 250 along line 438, interconnects lines 416 and 420 (FIG. 14).

Centrifugal controller 412 in master controller 254 is operably coupled to amplifier 262, described earlier, through auto/manual circuit 258. Auto/manual circuit 258 connects a potentiometer 276 having a wiper 440 with amplifier 262. Signal leg 442, connected with one fixed terminal of potentiometer 276, is connected directly with amplifier 262. Wiper 440 is connected by a normally open relay contact 444 actuated by relay coil 402 on the output side of PLC 256 (FIG. 12) with the summing terminal of amplifier 262 through line 446. Contact 444 is also interconnected to a common terminal of amplifier 262 by line 448 through a normally closed relay contact 450, which is also actuated by relay coil 402 (FIG. 12). A nonsumming terminal of amplifier 262 is interconnected by line 458 to a junction 452 through a junction 456 and a normally closed relay contact 454. Switch 454 and line 458 are also joined at junction 456 to normally open relay contact 460, coupled by line 462 to an output terminal 464 of centrifugal controller 412. Common line 466 extending from controller 412 is interconnected to the common terminal of amplifier 262 at junction 468 on line 448. Power line 470 extending from controller 412 is interconnected to the signal leg 442 of potentiometer 276. Both controller 412 and potentiometer signal leg 442 are coupled to power supply 472 which converts 115 volt AC power supplied by leads 302 and 304, to 12 volt DC power.

The input voltage supplied to amplifier 262, either through centrifugal controller 412 or through manual adjustment of potentiometer 276 is output as a current over lines 474 to EDC valve 185*d*. The other EDV valve 185*c*, shown in FIG. 13, is controlled by a current output from amplifier 264 which is manually adjusted through potentiometer 270. Both amplifiers 262 and 264 are powered through power supply 476 identical to power supply 408, which converts 115 volt AC power to 20± volt DC power.

OPERATION

Start-Up

With the components arranged as described above, the preferred mode of operation of SCS 50 includes introducing fluid into tank 60 through pipes 52 and 69 and into compartment 62*a* through discharge pipe 65, opened by valve 67. Compartments 62*b*–62*c* preferably do not receive any fluid directly through pipe 69 at this time. While compartment 62*a* is receiving the solids-laden fluid, it is assumed that power switch 306 (FIG. 10) has been moved to the "ON" position, lighting indicator lamp 317 and latching contact 334 is closed. It is also assumed that relay coil 316 has actuated relay switch 318 to provide power to tachometer modules 356, 358 and 360, and PLC 250. Upon the application of power, a self diagnostic program in PLC 250 is run and the status of all inputs is indicated by indicator lamps 392–398. To turn on the remainder of SCS 50, the operator confirms "STOP" switch 322 is out and depresses "START" switch 328 to actuate MCRC 336 and close master control relay contacts 334, 338 and 340. The closing of master control relay contacts 338, 340 provides 115 v AC power to the remainder of circuit 300 along leads 302, 304.

To bring centrifuge separators 100 and 102 on-line, diesel engine 178 is started to drive variable displacement hydraulic pumps 164, 166, 172 and 174. Pumps 172 and 174 drive centrifuge hydraulic motors 168 and 170 when the operator turns potentiometers 272 and 274 to the appropriate position to provide a voltage to amplifiers 266 and 268, respectively. Amplifiers 266 and 268, in turn, output a current to EDC valves 185*c* and 185*d* which control the amount of hydraulic fluid moved or displaced by pumps 172 and 174 to motors 168 and 170. After approximately three minutes, centrifuge separators 100 and/or 102 should be up to the preferred speed of 1,800 RPM. The RPM of each separator 100, 102 is displayed in control panel 202 by LED indicators operably coupled to tachometer modules 356 and 358.

Manual Control

To manually control the cleaning of solids from the fluid in compartment 62*a*, the operator moves three position switch 382 (FIG. 10), operably coupled to PLC 250, to the "HAND" position. To supply fluid to separators 100, 102, the operator opens either valve 72 on suction inlet 70 or valve 78 in suction inlet 76, depending upon whether fluid is to be taken from sump 68 or the center of compartment 62*a*. The operator should also make sure that all the appropriate valves 96, 106 are open so fluid may be moved to the appropriate separator(s) 100, 102 being used. For example, if the operator desires to draw fluid from the center of compartment 62*a*, valve 78 is opened by turning the handle adjacent the catwalk. The operator then slowly turns the centrifugal speed potentiometer 276 (FIG. 12) which provides a voltage to amplifier 262, which, in turn, outputs a current over line 474 to EDC valve 185 mounted on variable displacement pump 166 (FIG. 8). Pump 166, in turn, drives hydraulic motor 162 which, in turn, rotates centrifugal pump 84 to draw fluid through suction line 80 and suction inlet 76.

The fluid drawn from compartment 62*a* through suction inlet 76 and suction line 80 is moved by centrifugal pump 84 into discharge line 92, outlet pipe 94 and into the lower section 222 of conduit 98. The drilling fluid is further agitated by elbows 224 in conduit 98 mounted to wall 206 of tank 60. The drilling fluid flows through conduit 98 up over catwalk 204 where it is then selectively introduced into either centrifuge separator 100 or 102 by the position of valves 106 in pipes 104. As the fluid is introduced to centrifuge 100 and/or 102, an angular moment of force, or torque is generated which is exhibited by hydraulic pressure in the hydraulic lines 184 and 186 interconnecting variable displacement pumps 172 and 174, and hydraulic motors 168 and 170, respectively. The operator observes the system working pressure monitored by centrifugal controller 412 and displayed in a readout (not shown) on panel 202. Potentiometer 226 should be adjusted to an efficient operating pressure, such as approximately 2,000 to 2,700 pounds per square inch (PSI). The system will not automatically adjust to fluid consistency changes when in the manual mode. That is, centrifugal pump 84 will not automatically vary its output in response to an increase in torque exhibited by a hydraulic pressure increase to centrifuge separator 100 and/or 102. This must be done manually by adjusting potentiometer 276 in a clockwise, counterclockwise fashion to achieve the preferred operating pressure of 2,000 to 2,700 PSI.

As centrifuges 100 and/or 102 receive the fluid through conduit 98 from compartment 62a, each centrifuge throws the solids or particulate matter within the fluid to the outside of the rotating centrifuge drum. The less dense fluid moves to a larger end of the conical drum and is output through discharge line 108 into trough 110 in tank 60. The operator may then open one or more weir gates 112 so the water discharged from line 108 may then flow into compartment 62b or 62c. As either compartment 62b or 62c fills, the fluid is decanted and allowed to flow through gated pipe or trough 86 in fluid communication with pipe 56 so the clean fluid may then flow to suction tank 34. If necessary, water may be drawn directly from tank 62c through pipe 58 which is in fluid communication with the end of suction tank 34 and mud mixing pit 42 and pump 44.

Automatic Control

To automatically control SCS 50, the operator turns the "AUTO-OFF-HAND" selector switch 382 to the "AUTO" position. In this mode, with centrifuge separators 100, 102 rotating at a constant RPM and pressure after manual start-up, the rate at which fluid is withdrawn from compartment 62a through suction inlet 76 and valve 78 to centrifugal pump 84 is controlled automatically and monitored by PLC 250 and master controller 254 through the closed loop feedback system provided by system 240. In the automatic mode, fluid is drawn from compartment 62a by centrifugal pump 84 and supplied to centrifuge separators 100 and/or 102 through conduit 98. The concentration of solids contained in the fluid is reflected by the amount of torque, or angular moment of force, experienced by one or both centrifuge separators being used. As torque increases, hydraulic pressure to the respective hydraulic motor 168, 170 also increases. Pressure transducers 188 sense the hydraulic pressure in either of lines 184, 186 to hydraulic motors 168, 170 and outputs an analog signal to IOD 246 through lines 242, 244. IOD 246 converts both analog signals to digital signals which are transmitted to PLC 250 over digital data bus 248. Both digital signals from IOD 246 are compared to a maximum pressure limit programmed in PLC 250. PLC 250 compares the received digital signals with the programmed maximum limit, and based upon the greater signal, returns a digital signal to IOD 246 through data bus 248. The returned digital signal from PLC 250 is converted to a zero to ten volt scaled analog signal and output over line 252 to AIM 410 in master controller 254.

AIM 410 then converts the scaled analog input signal to a proportionally scaled pulsed or frequency modulated pulsed signal ranging from zero hertz to ten kilohertz. The modulated signal is then input to centrifugal controller 412 over circuit 414. The modulated input to centrifugal controller 414 determines a voltage to selectively supply via automatic/manual circuit 258 to amplifier 262.

In the automatic mode, potentiometer 276 in panel 202 is disabled by automatic/manual circuit 258 through relay contacts 440 and 450 actuated by coils 400, 402 on the output side of PLC 250. Conversely, relay contacts 454 and 460 disable centrifugal controller 440 when SCS 50 is placed in the manual mode. Amplifier 262, in response to the input voltage received from centrifugal controller 412, outputs a current over line 474 to EDC valve 185d mounted to variable displacement hydraulic pump 166 mentioned earlier. If, for example, either signal from transducers 188 compared by PLC 250 with a programmed limit were greater than the programmed limit, the PLC would instruct centrifugal controller 412, through IOD 246 and AIM 410, to decrease voltage to amplifier 262 which in turn would then reduce current to EDC valve 185d to change the displacement of hydraulic fluid by pump 166 to hydraulic motor 162. The reduced displacement and hydraulic fluid would thus, in effect, slow hydraulic motor 162 and reduce the volume of fluid pumped by centrifugal pump 84 to centrifuge separator 100 and/or 102.

Circuit 414 provides a constant voltage to centrifugal controller 412 for a predetermined period of time, such as 60 seconds, so that the automatic adjustment of fluid pumped by centrifugal pump 84 to centrifuges 100 and/or 102 will stabilize centrifuges 100, 102 to operate at their maximum efficiency. After the predetermined period of time has elapsed circuit 414 disengages, allowing unattended control. Circuit 414 automatically engages each time switch 382 is moved between either the "OFF" or "MANUAL" position to the "AUTO" position. To view the RPM of centrifugal pump 84, the operator must place switch 376 (FIG. 12) coupled to tachometer module 360 so as to read the RPM from the appropriate proximity sensor 372, 374.

If it is desired to draw water from sump 68 of compartment 62a, or any other compartment, the operator must open valve 72 in suction inlet 70 to draw fluid in through suction inlet line 74 to the auxiliary centrifugal pump 82. One valve 96 in discharge line 92 is opened to allow fluid drawn by centrifugal pump 82 into outlet line 94 and into conduit 98 to centrifuges 100 and/or 102. Operation of auxiliary pump 82 is accomplished by turning potentiometer 270 in control panel 202 to the desired speed position. Monitoring of the RPM of auxiliary pump 82 is accomplished by flipping switch 376 to the auxiliary pump position thus reading the signal from proximity transducer or sensor 374 located adjacent the shaft of pump 82.

Shut Down

To shut down SCS 50, the operator changes the "AUTO-OFF-HAND" switch 382 to the "OFF" position. The operator then moves potentiometer 276 and/or 270 to the zero position. Each centrifugal water pump 82 and/or 84 will decelerate and stop, allowing fluid in conduit 94 to achieve its lowest position in the line. The operator verifies that centrifugal pumps 82 and/or 84 have been stopped by reading the RPM read-out on tachometer module 360. The operator then returns potentiometers 272 and 274 to the "OFF" position which then stops variable displacement pumps 172 and 174 from driving hydraulic motors 168 and 170. The transmission between hydraulic motors 168 and 170 and centrifuge separators 100 and 102 is such that the centrifuge drums will slow at the same pace as hydraulic motors 168 and 170. The operators then turn off the power switch 306 to deactivate the system.

Tank Clean Out

To clean out any one compartment 62a–62c, SCS 50 is still in the actively running configuration. For example, if the operator wishes to clean compartment 62a and remove substantially all of the solids introduced therein by the influx of fluid through pipe 52, the operator opens valve 72 in suction inlet 70 to draw water in compartment 62a through inlet pipe 74 to auxiliary centrifugal pump 82. To agitate the water within compartment 62a, the operator opens valve 114 joining high pressure line 116 with outlet pipe 94. A portion of the fluid pumped by centrifugal pump 82 is then transferred to pipe 116 where it is then redirected back into compartment 62a through high pressure agitation jet/nozzle 118 disposed at the end of vertical pipe 120 coupled by elbow 122 and valve 126. Agitation jet 118 introduces high pressure fluid into compartment 62a adjacent floor 66 so as to suspend the solids within the fluid contained therein. The operator may adjust the flow through agitation nozzle 118 to maintain a constant agitation in compartment 62a through valve 126. The operator may also direct the flow within the compartment by a handle connected to pivoting vertical pipe 120.

The fluid drawn from compartment 62a through suction pipe 74 is passed to centrifuge separator 100 and/or 102 where the solids are removed and dumped into bin 200. The fluid is then discharged through line 108 into trough 110 wherein the operator has opened the appropriate weir gates 112 to discharge the cleaned fluid into one of the other compartments 62b and/or 62c. Once a compartment is substantially clean, the operator may open appropriate valves in the other compartments to clean the fluid contained therein, discharging the effluent from the centrifuge separators into the now empty and clean compartment.

Fluid Treatment

To improve solids separation of the fluid treated by SCS 50, it is sometimes desirable to treat the fluid with certain additives. In particular, it is desirable to remove the very fine or clay-sized particles from the fluid. One way to achieve this end is by forcing the small particles to bond together or flocculate into larger particles which are better separated through the settling process and/or through centrifugal separation. One way to achieve the flocculation of clay-sized particles in the fluid is by "sweetening" or changing the alkalinity of the fluid by introducing an acid therein. The polymer works best in a fluid that has a ph ranging between 4 and 6. The amount of acid introduced to the fluid would be adjusted so as to maintain the ph at the optimum level for the polymer to react with the solids contained therein. Preferably, the acid is contained in a 50-gallon drum or barrel which is located adjacent end 192 of tank 60 containing the hydraulic pumps and centrifugal pumps. A small centrifugal pump 132 draws acid from the acid barrel and pumps it into conduit 130 which is joined to the lowermost conduit 222 of conduit 98 at junction 128. Fluid moved by centrifugal pump 82 and/or 84 into conduit 98 receives the acid at junction 128 where it is mixed thoroughly with the fluid by the right-angle elbows 224. Flocculation of the clay-sized particles is further achieved by introduction of a polymer into conduit 98 at junction 138 through pipe 140 having an opposite end coupled to pump 142. Pump 166 then draws the polymer through pipe 144 from a reservoir 146 located on tank 60. The polymer is also thoroughly mixed with the fluid in conduit 98 by the right-angled elbows 224. A sample of the fluid may be drawn for testing through one inch pipe 148 and valve 152. The amount of fluid and/or polymer added to the fluid contained in conduit 74 may be adjusted to enhance the flocculation of clay-sized particles entrained in the fluid. When the treated fluid is then passed to centrifuges 100 and/or 102, the flocculated clay particles are then more easily thrown to the outside by the centrifugal force of the centrifuges and disposed in bin 200 located therebelow. The resulting effluent discharged through pipe 108 is substantially cleaner then before the addition of the acid and polymer therein, thus improving the efficiency of the centrifuge separators.

ALTERNATE APPLICATIONS

Although the description of SCS 50 has been made with specific reference to the treatment of drilling mud, it should be understood that SCS 50 may be applied equally as well to a variety of applications involving a fluid mixture containing solids. For example, contaminated soils may be excavated from a site and mixed with a liquid and cleaned by agitation in compartment 62a–62c. The agitated fluid may then be passed through conduit 98 by pumps 82 and/or 84 to centrifuge separators 100 and/or 102. Separators 100 and/or 102 may then be operated at their maximum efficiency so as to remove substantially all of the fluid including a substantial portion of the contaminants. The cuttings or solids taken from the mixture and transferred to bin 200 may then be found suitable for relocation in the site from which they were taken.

ALTERNATE EMBODIMENTS

In an alternate embodiment of the invention, separators 100, 102 may be positioned directly above container 30 on a platform as suggested by dotted area A shown in FIG. 1. In this way, cuttings discharged from the centrifuge separators may be deposited directly into container 30 instead of into bin 200 where they must be transferred by a front end loader to another container.

In another embodiment of the invention, centrifuge separators 100, 102 are located above container 30 as described above. In addition, container 30 may contain a drag line or augur 30a which extends the length thereof, and adapted to transfer the cuttings in container 30 to a solidification machine shown generally by reference numeral 30b (FIG. 1) and commercially available from Soli-Tech of Michigan. Solidification machine 30b preferably mixes the cuttings taken from tank 30 with a fine bonding material such as portland cement which binds any remaining fluid in the cuttings. The addition of cement powder to the cuttings also binds any contaminants therein and makes them more suitable for conventional landfills. The mixture of solids and cement may then be deposited by conveyor 30c into any one of a number of containers (not shown).

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

APPENDIX

```
+------------------------+--+---+-------------+--+-------------+
!                        !  !   !             !  ! Proj:MC     !
! SEPERATOR CONTROL      !  +   +-------------+  +-------------+
!      SYSTEM            !      ! Rev.dat:    \  ! Syst:F1/F2  !
!                        !      +-------------+--+-------------+
!                        !      ! Rev.no: A   !  ! Type:Ladder !
!                        +      +-------------+--+-------------+
!                        !      ! Sign: MGD   !  ! Page:  1    !
+------------------------+------+-------------+--+-------------+

!X400  M102                                              Y430  !
  0 +-I I---I/I---------------------------------------------( )--+
     !AUTO  INT                                              AUTO  !
     !SELEC OVER                                             LIGHT !
     !T     PRESS                                                  !
     !                                                             !
     !X401                                                    Y431 !
  3 +-I I-----------------------------------------------------( )--+
     !HAND                                                    HAND !
     !SELEC                                                   LIGHT!
     !T                                                            !
     !                                                             !
     !M100                                                    Y432 !
  5 +-I/I-----------------------------------------------------( )--+
     !INT                                                     LOW  !
     !LOW                                                     OIL  !
     !OIL                                                     LIGHT!
     !                                                             !
     !X402  M103                                              M100 !
  7 +-I I---I/I-----------------------------------------------( )--+
     !LOW   INT                                               INT  !
     !HYD   SYS                                               LOW  !
     !OIL   RESET                                             OIL  !
     !                                                             !
     !M101                                                    Y433 !
 10 +-I/I-----------------------------------------------------( )--+
     !INT                                                     HIGH !
     !HIGH                                                    TEMP !
     !TEMP                                                    LIGHT!
     !                                                             !
     !X403  M103                                              M101 !
 12 +-I I---I/I-----------------------------------------------( )--+
     !HIGH  INT                                               INT  !
     !TEMP  SYS                                               HIGH !
     !OIL   RESET                                             TEMP !
     !                                                             !
     !X405                                                    M102 !
 15 +-I I-----------------------------------------------------( )--+
     !OVER                                                    INT  !
     ! PRES                                                   OVER !
     !SURE                                                    PRESS!
     !                                                             !
     !T50   Y432  Y433  M102  M103  Y430                      Y436 !
 17 +-I/I---I/I---I/I---I/I---I/I---I I-----------------------( )--+
     !TIMER LOW   HIGH  INT   INT   AUTO                      ENBL !
     !CLOSE OIL   TEMP  OVER  SYS   LIGHT                     CLOSE!
     ! LOOP LIGHT LIGHT PRESS RESET                           LOOP !
     !                                                             !
```

```
+-----------------------+-------------------+-------------------+-------------------+
! Proj:MC              ! Syst:F1/F2        ! Type:Ladder       ! Page:  2          !
+-----------------------+-------------------+-------------------+-------------------+

!Y430   M71   M103                                                K30.0  !
  24 +-I I---I/I---I/I-----------------------------------------------(T50  )+
     !AUTO   RESET INT                                                 TIMER !
     !LIGHT  ON    SYS                                                 CLOSE !
     !       POWER RESET                                               LOOP  !
     !                                                                       !
     !M100   M101                                                      Y437  !
  29 +-I I---I I----------------------------------------------------( )--+
     !INT    INT                                                       SYS   !
     !LOW    HIGH                                                      ENBL  !
     !OIL    TEMP                                                      MCR   !
     !                                                                       !
     !X404                                                             M103  !
  32 +-I I----------------------------------------------------------( )--+
     !RESET                                                            INT   !
     ! SYS                                                             SYS   !
     !PB                                                               RESET !
     !                                                                       !
     !M70                                                              K412  !
  34 +-I I-+--------------------------------------------------------(F671)+
     !IN   !                                                          READ   !
     !RUN  !                                                          ANLOG  !
     !MODE !                                                          VALU   !
     !     !                                                                 !
     !     !                                                          K710   !
     !     +--------------------------------------------------------(F672)+
     !     !                                                          XFER   !
     !     !                                                          ANLOG  !
     !     !                                                          VALU   !
     !     !                                                                 !
     !     !                                                          K85    !
     !     +--------------------------------------------------------(F670)+
     !     !                                                          GO     !
     !     !                                                          INSTR  !
     !     !                                                                 !
     !     !                                                          K413   !
     !     +--------------------------------------------------------(F671)+
     !     !                                                          READ   !
     !     !                                                          ANLOG  !
     !     !                                                          VALU   !
     !     !                                                                 !
     !     !                                                          K720   !
     !     +--------------------------------------------------------(F672)+
     !     !                                                          XFER   !
     !     !                                                          ANLOG  !
     !     !                                                          VALU   !
     !     !                                                                 !
     !     !                                                          K85    !
     !     +--------------------------------------------------------(F670)+
     !                                                                GO     !
     !                                                                INSTR  !
     !                                                                       !
```

```
    +---------------------+---------------------+----------------------+--------------+
    ! Proj:MC             ! Syst:F1/F2          ! Type:Ladder         ! Page:   3    !
    +---------------------+---------------------+----------------------+--------------+

!M200                                                                K710
    47 +-I I-+----------------------------------------------------------------(F671)
       !INT  !                                                              READ
       !LESS !                                                              ANLOG
       !THAN !                                                              VALU
       !     !
       !M201 !                                                               K401
       +-I I-+----------------------------------------------------------------(F672)
       !INT  !                                                              XFER
       !EQUAL!                                                              ANLOG
       ! THAN!                                                              VALU
       !     !
       !     !                                                               K86
       !     +----------------------------------------------------------------(F670)
       !                                                                    GO
       !                                                                    INSTR
       !
       !
       !M202                                                                 K720
    55 +-I I-+----------------------------------------------------------------(F671)
       !INT  !                                                              READ
       !GRTR !                                                              ANLOG
       !THAN !                                                              VALU
       !     !
       !     !                                                               K401
       !     +----------------------------------------------------------------(F672)
       !                                                                    XFER
       !                                                                    ANLOG
       !                                                                    VALU
       !
       !                                                                     K86
       !     +----------------------------------------------------------------(F670)
       !                                                                    GO
       !                                                                    INSTR
       !
       !M70                                                                  K710
    62 +-I I-+----------------------------------------------------------------(F671)
       !IN   !                                                              READ
       !RUN  !                                                              ANLOG
       !MODE !                                                              VALU
       !     !
       !     !                                                               K720
       !     +----------------------------------------------------------------(F672)
       !                                                                    XFER
       !                                                                    ANLOG
       !                                                                    VALU
       !
       !                                                                     K45
       !     +----------------------------------------------------------------(F670)
       !                                                                    GO
       !                                                                    INSTR
       !
```

```
+---:-------------------+----------------------+--------------------+-----------------+
! Proj:MC              ! Syst:F1/F2           ! Type:Ladder       ! Page:   4
+----------------------+----------------------+--------------------+-----------------+

!M571                                                              M200
 69 +-I I------------------------------------------------------------( )--
     !FLAG                                                              INT
     !LESS                                                              LESS
     !THAN                                                              THAN
     !
     !M572                                                              M201
 71 +-I I------------------------------------------------------------( )--
     !FLAG                                                              INT
     !EQUAL                                                             EQUAL
     ! THAN                                                              THAN
     !
     !M573                                                              M202
 73 +-I I------------------------------------------------------------( )--
     !FLAG                                                              INT
     !GRTR                                                              GRTR
     !THAN                                                              THAN
     !
```

```
+---------------------+  +----------------------+----------------+----------------+
!                     !  !                      !                ! Proj:MC        !
! SEPERATOR CONTROL   !  !                      +----------------+----------------+
!         SYSTEM      !  !              Rev:dat:!                ! Syst:F1/F2     !
!                     !  !                      +----------------+----------------+
!                     !  !              Rev.no: A                ! Type:Name      !
!                     +  +                      +----------------+----------------+
!                     !  !              Sign: MGD                ! Page:  1       !
+---------------------+  +----------------------+----------------+----------------+
   I/O         Name              Comment                        Remark X400      AUTO SELECT        AUTO SELECTOR SWITCH
   X401      HAND SELECT        HAND SELECTOR SWITCH
   X402      LOW  HYD  OIL      LOW HYDRAULIC OIL LEVEL
   X403      HIGH TEMP OIL      HIGH TEMPERATURE OIL SWITCH
   X404      RESET SYS PB       RESET SYSTEM PUSHBUTTON
   X405      OVER  PRESSURE     SYSTEM OVER PRESSURE SHUTDOWN
   Y430      AUTO LIGHT         AUTOMATIC LIGHT
   Y431      HAND LIGHT         HAND LIGHT
   Y432      LOW  OIL  LIGHT    LOW HYDRAULIC OIL LIGHT
   Y433      HIGH TEMP LIGHT    HYDRAULIC OIL HIGH TEMPERATURE
   Y436      ENBL CLOSELOOP     ENABLE CLOSE LOOP FUNCTION
   Y437      SYS  ENBL MCR      SYSTEM MASTER CONTROL RELAY EN
   M70       IN   RUN  MODE     SYSTEM INTERNAL IN RUN MODE
   M71       RESET ON  POWER    SYSTEM INTERNAL RESET ON POWER
   M100      INT  LOW  OIL      INTERNAL LOW OIL SWITCH
   M101      INT  HIGH TEMP     INTERNAL HIGH TEMPERATURE OIL
   M102      INT  OVER PRESS    INTERNAL SYSTEM OVER PRESSURE
   M103      INT  SYS  RESET    INTERNAL SYSTEM RESET
   M200      INT  LESS THAN     INTERNAL LESS THAN COMPARISON
   M201      INT  EQUAL THAN    INTERNAL EQUAL TO COMPARISON
   M202      INT  GRTR THAN     INTERNAL GREATER THAN COMPARIS
   M571      FLAG LESS THAN     FLAG LESS THAN COMPARISON
   M572      FLAG EQUAL THAN    FLAG EQUAL TO COMPARISON
   M573      FLAG GRTR THAN     FLAG GREATER THAN COMPARISON
   T50       TIMERCLOSE LOOP    TIMER TO CLOSE SYSTEM LOOP
   F670      GO   INSTR         SPECIAL FUNCTION GO INSTR
   F671      READ ANLOG VALU    SPECIAL FUNCTION READ ANALOG
   F672      XFER ANLOG VALU    SPECIAL FUNCTION WRITE ANALOG
```

```
+---------------------------+--------------------+--------------------+-----------------+
! OPERATOR CONTROL          !                    !                    ! Proj:MC         !
!        SYSTEM             !                    ! Rev.dat:           ! Syst:F1/F2      !
!                           !                    ! Rev.no: A          ! Type:Crossrf    !
!                           !                    ! Sign: MGD          ! Page:  1        !
+---------------------------+--------------------+--------------------+-----------------+
                                    ------ Input ------

X400        AUTO  SELECT        AUTO SELECTOR SWITCH
          0       -I I-
    X401        HAND  SELECT        HAND SELECTOR SWITCH
          3       -I I-
    X402        LOW  HYD  OIL       LOW HYDRAULIC OIL LEVEL
          7       -I I-
    X403        HIGH TEMP OIL       HIGH TEMPERATURE OIL SWITCH
         12       -I I-
    X404        RESET SYS PB        RESET SYSTEM PUSHBUTTON
         32       -I I-
    X405        OVER  PRESSURE      SYSTEM OVER PRESSURE SHUTDOWN
         15       -I I-

------ Output ------

Y430        AUTO LIGHT          AUTOMATIC LIGHT
          2       -( )-       22      -I I-      24     -I I-
    Y431        HAND LIGHT          HAND LIGHT
          4       -( )-
    Y432        LOW  OIL  LIGHT     LOW HYDRAULIC OIL LIGHT
          6       -( )-       18      -I/I-
    Y433        HIGH TEMP LIGHT     HYDRAULIC OIL HIGH TEMPERATURE
         11       -( )-       19      -I/I-
    Y436        ENBL CLOSELOOP      ENABLE CLOSE LOOP FUNCTION
         23       -( )-
    Y437        SYS  ENBL  MCR      SYSTEM MASTER CONTROL RELAY EN
         31       -( )-

------ Mem/Latch ------

M70         IN  RUN  MODE       SYSTEM INTERNAL IN RUN MODE
         34       -I I-       62      -I I-
    M71         RESET ON  POWER     SYSTEM INTERNAL RESET ON POWER
         25       -I/I-
    M100        INT  LOW  OIL       INTERNAL LOW OIL SWITCH
          5       -I/I-        9      -( )-      29     -I I-
    M101        INT  HIGH TEMP      INTERNAL HIGH TEMPERATURE OIL
         10       -I/I-       14      -( )-      30     -I I-
    M102        INT  OVER PRESS     INTERNAL SYSTEM OVER PRESSURE
          1       -I/I-       16      -( )-      20     -I/I-
    M103        INT  SYS  RESET     INTERNAL SYSTEM RESET
          8       -I/I-       13      -I/I-      21     -I/I-      26    -I/I-
         33       -( )-
    M200        INT  LESS THAN      INTERNAL LESS THAN COMPARISON
         47       -I I-       70      -( )-
    M201        INT  EQUAL THAN     INTERNAL EQUAL TO COMPARISON
         48       -I I-       72      -( )-
    M202        INT  GRTR THAN      INTERNAL GREATER THAN COMPARIS
         55       -I I-       74      -( )-
```

```
+---------------------------+-----------------------------+-------------------+----------------+
! Proj:MC                   ! Syst:F1/F2                  ! Type:Crossrf     ! Page:  2      !
+---------------------------+-----------------------------+-------------------+----------------+
--------------------------- Mem/Latch --------------------------

M571       FLAG LESS THAN     FLAG LESS THAN COMPARISON
        69      -I I-
   M572       FLAG EQUAL THAN    FLAG EQUAL TO COMPARISON
        71      -I I-
   M573       FLAG GRTR THAN     FLAG GREATER THAN COMPARISON
        73      -I I-

--------------------------- Timer ---------------------------

T50        TIMERCLOSE LOOP    TIMER TO CLOSE SYSTEM LOOP
        17      -I/I-      27     -( )-

--------------------------- DiagMem ---------------------------

F670       GO   INSTR         SPECIAL FUNCTION GO INSTR
        39      -( )-      45     -( )-      53     -( )-      60     -( )-
        67      -( )-
   F671       READ ANLOG VALU    SPECIAL FUNCTION READ ANALOG
        35      -( )-      41     -( )-      49     -( )-      56     -( )-
        63      -( )-
   F672       XFER ANLOG VALU    SPECIAL FUNCTION WRITE ANALOG
        37      -( )-      43     -( )-      51     -( )-      58     -( )-
        65      -( )-
```

```
+-------------------------------+-----------------------+----------------------------+---------------------+
!                               !                       !                            ! Proj:MC             !
! SEPERATOR CONTROL             !                       +----------------------------+---------------------+
!     SYSTEM                    !                       ! Rev.dat:                   ! Syst:F1/F2          !
!                               !                       +----------------------------+---------------------+
!                               !                       ! Rev.no: A                  ! Type:I/O-use        !
!                               +-                      +----------------------------+---------------------+
!                               !                       ! Sign: MGD                  ! Page:  1            !
+-------------------------------+-----------------------+----------------------------+---------------------+
----------------------------------------- Input ------------------------------------------

I I( )              I I( )              I I( )              I I( )
   X0    - -          X1     - -          X2     - -          X3     - -
   X4    - -          X5     - -          X6     - -          X7     - -
   X10   - -          X11    - -          X12    - -          X13    - -
   X14   - -          X15    - -          X16    - -          X17    - -
   X20   - -          X21    - -          X22    - -          X23    - -
   X24   - -          X25    - -          X26    - -          X27    - -
   X400  * -          X401   * -          X402   * -          X403   * -
   X404  * -          X405   * -          X406   - -          X407   - -
   X410  - -          X411   - -          X412   - -          X413   - -
   X414  - -          X415   - -          X416   - -          X417   - -
   X420  - -          X421   - -          X422   - -          X423   - -
   X424  - -          X425   - -          X426   - -          X427   - -
   X500  - -          X501   - -          X502   - -          X503   - -
   X504  - -          X505   - -          X506   - -          X507   - -
   X510  - -          X511   - -          X512   - -          X513   - -
   X514  - -          X515   - -          X516   - -          X517   - -
   X520  - -          X521   - -          X522   - -          X523   - -
   X524  - -          X525   - -          X526   - -          X527   - -

---------------------------------------- Output -----------------------------------------

I I( )              I I( )              I I( )              I I( )
   Y30   - -          Y31    - -          Y32    - -          Y33    - -
   Y34   - -          Y35    - -          Y36    - -          Y37    - -
   Y40   - -          Y41    - -          Y42    - -          Y43    - -
   Y44   - -          Y45    - -          Y46    - -          Y47    - -
   Y430  * *          Y431   - *          Y432   * *          Y433   * *
   Y434  - -          Y435   - -          Y436   - *          Y437   - *
   Y440  - -          Y441   - -          Y442   - -          Y443   - -
   Y444  - -          Y445   - -          Y446   - -          Y447   - -
   Y530  - -          Y531   - -          Y532   - -          Y533   - -
   Y534  - -          Y535   - -          Y536   - -          Y537   - -
   Y540  - -          Y541   - -          Y542   - -          Y543   - -
   Y544  - -          Y545   - -          Y546   - -          Y547   - -

--------------------------------------- Mem/Latch ---------------------------------------

I I( )              I I( )              I I( )              I I( )
   M70   * - E1       M71    * - E1       M72    - -          M73    - -
   M74   - -          M75    - -          M76    - -          M77    - -
   M100  * *          M101   * *          M102   * *          M103   * *
   M104  - -          M105   - -          M106   - -          M107   - -
   M110  - -          M111   - -          M112   - -          M113   - -
   M114  - -          M115   - -          M116   - -          M117   - -
   M120  - -          M121   - -          M122   - -          M123   - -
   M124  - -          M125   - -          M126   - -          M127   - -
   M130  - -          M131   - -          M132   - -          M133   - -
   M134  - -          M135   - -          M136   - -          M137   - -
   M140  - -          M141   - -          M142   - -          M143   - -
   M144  - -          M145   - -          M146   - -          M147   - -
   M150  - -          M151   - -          M152   - -          M153   - -
```

```
* = Used   E0 = Dual coil   E1 = No coil   E2 = No contact   E3 = SET/RST no match
+---------------------------+-----------------------+--------------------+---------------+
! Proj:MC                   ! Syst:F1/F2            ! Type:I/O-use       ! Page:  2      !
+---------------------------+-----------------------+--------------------+---------------+
----------------------------------- Mem/Latch ----------------------------------------
```

|      | I I( ) |      | I I( ) |      | I I( ) |      | I I( ) |
|------|--------|------|--------|------|--------|------|--------|
| M154 | - -    | M155 | - -    | M156 | - -    | M157 | - -    |
| M160 | - -    | M161 | - -    | M162 | - -    | M163 | - -    |
| M164 | - -    | M165 | - -    | M166 | - -    | M167 | - -    |
| M170 | - -    | M171 | - -    | M172 | - -    | M173 | - -    |
| M174 | - -    | M175 | - -    | M176 | - -    | M177 | - -    |
| M200 | * *    | M201 | * *    | M202 | * *    | M203 | - -    |
| M204 | - -    | M205 | - -    | M206 | - -    | M207 | - -    |
| M210 | - -    | M211 | - -    | M212 | - -    | M213 | - -    |
| M214 | - -    | M215 | - -    | M216 | - -    | M217 | - -    |
| M220 | - -    | M221 | - -    | M222 | - -    | M223 | - -    |
| M224 | - -    | M225 | - -    | M226 | - -    | M227 | - -    |
| M230 | - -    | M231 | - -    | M232 | - -    | M233 | - -    |
| M234 | - -    | M235 | - -    | M236 | - -    | M237 | - -    |
| M240 | - -    | M241 | - -    | M242 | - -    | M243 | - -    |
| M244 | - -    | M245 | - -    | M246 | - -    | M247 | - -    |
| M250 | - -    | M251 | - -    | M252 | - -    | M253 | - -    |
| M254 | - -    | M255 | - -    | M256 | - -    | M257 | - -    |
| M260 | - -    | M261 | - -    | M262 | - -    | M263 | - -    |
| M264 | - -    | M265 | - -    | M266 | - -    | M267 | - -    |
| M270 | - -    | M271 | - -    | M272 | - -    | M273 | - -    |
| M274 | - -    | M275 | - -    | M276 | - -    | M277 | - -    |
| M300 | - -    | M301 | - -    | M302 | - -    | M303 | - -    |
| M304 | - -    | M305 | - -    | M306 | - -    | M307 | - -    |
| M310 | - -    | M311 | - -    | M312 | - -    | M313 | - -    |
| M314 | - -    | M315 | - -    | M316 | - -    | M317 | - -    |
| M320 | - -    | M321 | - -    | M322 | - -    | M323 | - -    |
| M324 | - -    | M325 | - -    | M326 | - -    | M327 | - -    |
| M330 | - -    | M331 | - -    | M332 | - -    | M333 | - -    |
| M334 | - -    | M335 | - -    | M336 | - -    | M337 | - -    |
| M340 | - -    | M341 | - -    | M342 | - -    | M343 | - -    |
| M344 | - -    | M345 | - -    | M346 | - -    | M347 | - -    |
| M350 | - -    | M351 | - -    | M352 | - -    | M353 | - -    |
| M354 | - -    | M355 | - -    | M356 | - -    | M357 | - -    |
| M360 | - -    | M361 | - -    | M362 | - -    | M363 | - -    |
| M364 | - -    | M365 | - -    | M366 | - -    | M367 | - -    |
| M370 | - -    | M371 | - -    | M372 | - -    | M373 | - -    |
| M374 | - -    | M375 | - -    | M376 | - -    | M377 | - -    |
| M470 | - -    | M471 | - -    | M472 | - -    | M473 | - -    |
| M474 | - -    | M475 | - -    | M476 | - -    | M477 | - -    |
| M570 | - -    | M571 | * - E1 | M572 | * - E1 | M573 | * - E1 |
| M574 | - -    | M575 | - -    | M576 | - -    | M577 | - -    |

```
-------------------------------------- Timer ----------------------------------------
```

|      | I I( ) |      | I I( ) |      | I I( ) |      | I I( ) |
|------|--------|------|--------|------|--------|------|--------|
| T50  | * *    | T51  | - -    | T52  | - -    | T53  | - -    |
| T54  | - -    | T55  | - -    | T56  | - -    | T57  | - -    |
| T450 | - -    | T451 | - -    | T452 | - -    | T453 | - -    |
| T454 | - -    | T455 | - -    | T456 | - -    | T457 | - -    |
| T550 | - -    | T551 | - -    | T552 | - -    | T553 | - -    |
| T554 | - -    | T555 | - -    | T556 | - -    | T557 | - -    |
| T650 | - -    | T651 | - -    | T652 | - -    | T653 | - -    |
| T654 | - -    | T655 | - -    | T656 | - -    | T657 | - -    |

```
·* = Used   E0 = Dual coil   E1 = No coil   E2 = No contact   E3 = SET/RST no match +------------------------+-------------------------+--------------------+-------------------+
! Proj:MC                ! Syst:F1/F2              ! Type:I/O-use       ! Page:   3         !
+------------------------+-------------------------+--------------------+-------------------+
------------------------------ DiagMem ------------------------------

I  I( )            I  I( )            I  I( )            I  I( )

F670  -  * E0      F671  -  * E0      F672  -  * E0      F673  -  -
       F674  -  -         F675  -  -         F676  -  -         F677  -  -
```

The embodiments of the invention in which an exclusive property or privilege is claimed are defined as follows:

1. An apparatus for removing solids from a fluid, comprising in combination:

at least one centrifuge separator for separating solids from the fluid;

a motor coupled to said at least one centrifuge separator for driving said at least one centrifuge separator at a predetermined speed;

at least one continuously variable displacement pump in fluid communication with said at least one centrifuge separator for supplying the fluid thereto; and a sensor connected to said motor through a line providing power to said motor said sensor providing an output indicative of an angular moment of force within said at least one centrifuge separator, said output inversely varying the volume of fluid provided by said at least one variable displacement pump to said at least one centrifuge separator in response to said angular moment of force.

2. The apparatus as defined in claim 1, further including:

a tank for temporarily containing the fluid and coupled in fluid communication with said at least one pump and said at least one centrifuge separator.

3. The apparatus as defined in claim 2, further including:

at least one conduit for introducing the fluid into said tank;

at least one conduit having an inlet in said tank and in fluid communication with said at least one pump for supplying the fluid to said at least one pump;

at least one conduit respectively placing said at least one pump in fluid communication with at least one respective inlet to said at least one centrifuge separator for supplying the fluid to said at least one centrifuge separator; and means for receiving a fluid effluent from said at least one centrifuge separator generally free of insolubles.

4. The apparatus as defined in claim 3, further including:

at least one conduit in said tank for decanting fluid therefrom.

5. A method for removing solids from a fluid, comprising the steps of:

providing at least one centrifuge separator for separating solids from the fluid;

driving said at least one centrifuge separator at a predetermined speed by a motor coupled to said at least one centrifuge separator;

supplying the fluid to said at least one centrifuge separator using a variable displacement pump;

detecting an angular moment of force in said at least one centrifuge separator produced by the solids in the fluid by a sensor disposed in a power line to said motor;

generating a signal from said sensor indicative of said angular moment of force; and continuously inversely varying the volume of fluid supplied to said at least one centrifuge separator in response to said signal from said sensor to maximize separation of the solids from the fluid.

6. A system for removing solids from a fluid, comprising in combination:

a centrifuge separator including a shell, a concentric screw, and a hydraulic motor attached to said shell for spinning said shell at a predetermined speed;

a continuously variable-displacement pump in fluid communication with said centrifuge separator for providing the fluid thereto;

a hydraulic pump coupled to said hydraulic motor by at least one hydraulic line for providing hydraulic fluid to said motor at a predetermined rate for driving said shell; and a system for detecting an angular moment of force in said centrifuge separator exhibited by said hydraulic fluid and producing an output for inversely varying an output of said continuously variable displacement pump; and said system including a sensor disposed in one of said at least one hydraulic line for detecting an angular moment of force in said centrifuge separator, said sensor producing an output which inversely varies an output of said continuously variable displacement pump providing fluid to said centrifuge separator.

\* \* \* \* \*